US012790468B2

(12) United States Patent
Khan

(10) Patent No.: US 12,790,468 B2
(45) Date of Patent: Nov. 10, 2026

(54) BIOPOLYMER COMPOSITE AND ITS USE AND MANUFACTURE AS WELL AS BIOPOLYMER MASTERBATCH AND KIT FOR PRODUCING THE BIOPOLYMER COMPOSITE

(71) Applicant: COPOL INTERNATIONAL LTD., North Sydney (CA)

(72) Inventor: Avik Khan, Fredericton (CA)

(73) Assignee: COPOL INTERNATIONAL LTD., North Sydney (CA)

( * ) Notice: Subject to any disclaimer, the term of this patent is extended or adjusted under 35 U.S.C. 154(b) by 633 days.

(21) Appl. No.: 17/906,899

(22) PCT Filed: Mar. 10, 2021

(86) PCT No.: PCT/CA2021/050317
§ 371 (c)(1),
(2) Date: Sep. 21, 2022

(87) PCT Pub. No.: WO2021/189128
PCT Pub. Date: Sep. 30, 2021

(65) Prior Publication Data

US 2023/0365788 A1 Nov. 16, 2023

Related U.S. Application Data

(60) Provisional application No. 62/994,275, filed on Mar. 24, 2020.

(51) Int. Cl.
*C08L 5/04* (2006.01)
*C08J 3/22* (2006.01)
(Continued)

(52) U.S. Cl.
CPC ................ *C08L 5/04* (2013.01); *C08J 3/226* (2013.01); *C08L 5/08* (2013.01); *C08L 23/12* (2013.01);
(Continued)

(58) Field of Classification Search
CPC .... C08L 5/04; C08L 5/08; C08L 23/12; C08L 71/02; C08L 51/06; C08L 5/10;
(Continued)

(56) References Cited

U.S. PATENT DOCUMENTS 5,635,550 A 6/1997 Dehennau et al.
2011/0135912 A1 6/2011 Xu
(Continued)

FOREIGN PATENT DOCUMENTS

CN 102120514 B 7/2011
CN 109504009 A 3/2019
(Continued)

OTHER PUBLICATIONS

English translation of CN 110818989A (Year: 2020).*
(Continued)

*Primary Examiner* — Alicia Bland
(74) *Attorney, Agent, or Firm* — Lavery, de Billy, L.L.P.; Isabelle Pelletier

(57) ABSTRACT

A biopolymer composite of the invention comprising a) an alginate salt, b) chitosan, c) a plasticizer, d) a compatibilizer, and e) a thermoplastic polymer, wherein the alginate salt, the chitosan, the plasticizer and the compatibilizer are dispersed in a matrix of the thermoplastic polymer, is provide. A method, a masterbatch and a kit producing the biopolymer composite are also provided. Finally, articles comprising the biopolymer composite are provided.

17 Claims, 8 Drawing Sheets

(51) Int. Cl.
*C08L 5/08* (2006.01)
*C08L 23/12* (2006.01)

(52) U.S. Cl.
CPC ........ *C08J 2323/14* (2013.01); *C08J 2405/04* (2013.01); *C08J 2405/08* (2013.01); *C08J 2423/26* (2013.01)

(58) Field of Classification Search
CPC .... C08J 3/226; C08J 2323/14; C08J 2405/04; C08J 2405/08; C08J 2423/26; C08J 2423/12; C08J 2471/02; C08J 5/18; C08K 5/053
See application file for complete search history.

(56) References Cited

U.S. PATENT DOCUMENTS

| | | | | |
|---|---|---|---|---|
| 2018/0345637 | A1* | 12/2018 | Hackfort | B32B 9/045 |
| 2020/0216668 | A1* | 7/2020 | Bruce | B29C 48/022 |

FOREIGN PATENT DOCUMENTS

| | | | | |
|---|---|---|---|---|
| CN | 110818989 A | 2/2020 | | |
| WO | 2006086888 A1 | 8/2006 | | |
| WO | WO-2019152829 A1 * | 8/2019 | | C08L 23/06 |

OTHER PUBLICATIONS

Caner, C., Vergano, P. J., & Wiles, J. L., Chitosan Film Mechanical and Permeation Properties as Affected by Acid, Plasticizer, and Storage, Journal of Food Science, (1998), vol. 63(6), 1049-1053.

Carrasco-Guigón, F., Rodriguez-Felix, D., Castillo-Ortega, M., Santacruz-Ortega, H., Burruel-Ibarra, S., Encinas-Encinas, J., Madera-Santana, T., Preparation and characterization of extruded composites based on polypropylene and chitosan compatibilized with polypropylene-graft-maleic anhydride, Materials, (2017),10(2), 105.

Matet, M., Heuzey, M.-C., Ajji, A., & Sarazin, P., Plasticized chitosan/polyolefin films produced by extrusion, Carbohydrate Polymers, (2015), 117, 177-184.

Martau, g. a et al., The use of Chitosan, Alginate and Pectine in Biomedical and food sector Biocompatibility, Biodhesiveness and Biodegradability, Polymers, (2019), vol. 11, 1837.

Meng, Q., Heuzey, M.-C., & Carreau, P.J., Hierarchical structure and physicochemical properties of plasticized chitosan, Biomacromolecules, (2014), 15(4), 1216-1224.

Van Den Broek, L. A. M., Knoop, R. J. I., Kappen, F. H. J., & Boeriu, C. G., Chitosan films and blends for packaging material, Carbohydrate Polymers, (2015), 116, 237-242.

Vieira, M. G. A., da Silva, M. A., dos Santos, L. O., & Beppu, M. M., Natural-based plasticizers and biopolymer films: A review. European Polymer Journal, (2011), 47(3), 254-263.

* cited by examiner

BIOPOLYMER COMPOSITE AND ITS USE AND MANUFACTURE AS WELL AS BIOPOLYMER MASTERBATCH AND KIT FOR PRODUCING THE BIOPOLYMER COMPOSITE

CROSS REFERENCE TO RELATED APPLICATIONS

This application is a National Entry Application of PCT application no PCT/CA2021/050317 filed on Mar. 10, 2021 and published in English under PCT Article 21(2), which itself claims benefit, under 35 U.S.C. § 119(e), of U.S. provisional application Ser. No. 62/994,275, filed on Mar. 24, 2020. All documents above are incorporated herein in their entirety by reference.

FIELD OF THE INVENTION

The present invention relates to a biopolymer composite. Further, the invention provides a biopolymer masterbatch which, when used in conjunction with a thermoplastic polymer, allows producing the biopolymer composite. More specifically, the present invention is concerned with a biopolymer masterbatch that allows incorporating biodegradable biopolymers into thermoplastic polymers, replacing a significant percentage of thermoplastic polymer from current products such as melt-cast polypropylene (CPP) films typically used for packaging applications, to yield a biopolymer/thermoplastic polymer composite.

BACKGROUND OF THE INVENTION

One-third of household waste consist of food packaging materials. About 80% of these are single-use plastics, of which only a small percentage get recycled. Globally 39% of all the plastics produced are used by the packaging industry. Only 14% of the plastic packaging is recycled globally. Most of them end up in landfills and water bodies, polluting the ecosystem. Plastics have become an integral part of the present economy and lifestyle. Although plastics are used in every aspect, use in food packaging has a high chance of organic contamination, preventing recycling prospects.

Global environmental concern, regarding the use of non-biodegradable petroleum-based packaging materials, coupled with consumer awareness has created demand for sustainable and biodegradable packaging materials, especially for food application.

Thermoplastic polymers such as polypropylene and polyester have been widely used as packaging materials due to their excellent mechanical, heat resistance, transparency and water vapor barrier properties. In fact, polymers such as, polyethylene, polypropylene, polyesters, have become the workhorse material of packaging (including food) owing to their versatile nature, low cost and ease of production. However, their oxygen barrier property (oxygen permeability) is poor for many applications and requires blending/coating of other thermoplastic films known for excellent oxygen barrier such as ethylene-vinyl alcohol copolymer. While, this is a very commonly used method in the packaging industry, it does have a serious drawback as the resultant packaging material is rendered non-recyclable due to the infusion of different thermoplastic materials.

Utilization of biopolymers as packaging materials is attractive due to non-toxic, biodegradable and compostable properties of these materials, which eases burdens on landfills. However, packaging films made from these materials often suffer deficiencies such as, brittleness, poor processability, high water vapor permeability, and poor tear strength. These biopolymers packaging materials are no match to the mechanical properties of the packaging materials based on synthetic polymers.

The market demands sustainable, biodegradable packaging materials and packaging materials with increased biodegradable content.

SUMMARY OF THE INVENTION

In accordance with the present invention, there is provided:

1. A biopolymer composite comprising:
   a) an alginate salt,
   b) chitosan,
   c) a plasticizer,
   d) a compatibilizer, and
   e) a thermoplastic polymer,
   wherein the alginate salt, the chitosan, the plasticizer and the compatibilizer are dispersed in a matrix of the thermoplastic polymer.
2. The composite of item 1, wherein the degree of deacetylation of the chitosan ranges from about 60 to about 98%, preferably from about 75% to about 95%, and more preferably from about 80 to about 85%.
3. The composite of item 1 or 2, the molecular weight of the chitosan ranges from about 100 kDa to about 700 kDa, preferably from about 100 kDa to about 500 kDa, and more preferably from about 300 kDa to about 375 kDa.
4. The composite of any one of items 1 to 3, wherein the alginate salt is sodium alginate, potassium alginate, or calcium alginate, preferably sodium alginate.
5. The composite of any one of items 1 to 4, wherein the molecular weight of the alginate salt ranges from about 150 kDa to about 900 kDa, preferably from about 300 kDa to about 700 kDa.
6. The composite of any one of items 1 to 5, wherein the chitosan and the alginate salt are present at a chitosan: alginate salt weight ratio of about 50:50 to about 99.5:0.5, preferably about 50:50 to about 99:1, more preferably of about 65:35 to about 85:15, and most preferably of about 75:25.
7. The composite of any one of items 1 to 6, wherein the plasticizer is polyethylene glycol (PEG), polypropylene glycol (PPG), glycerol, or a mixture thereof, preferably polyethylene glycol.
8. The composite of any one of items 1 to 7, wherein the plasticizer is present at a concentration between about 1 wt % to about 60 wt %, preferably between about 1 wt % to about 50 wt %, more preferably between about 20 wt % to about 50 wt %, and most preferably of about 25 wt %, based on the total weight of the chitosan and the alginate salt.
9. The composite of any one of items 1 to 8, wherein the chitosan, the alginate salt, and the plasticizer are present at a total concentration of about 1 wt % to about 65 wt %, preferably about 5 wt % to about 50 wt %, more preferably of about 5 wt % to about 25 wt %, and most preferably of about 5 wt % to about 10 wt %, based on the total weight of the biopolymer composite.
10. The composite of any one of items 1 to 9, wherein the compatibilizer is maleic anhydride, polypropylene-grafted-maleic anhydride (PP-g-MA), epoxy styrene-acrylic oligomers (ESAO), poly(ethylene-co-octene), polyvinyl alcohol (PVA), polyvinyl acetate, poly(ethylene-co-vinyl alcohol), glycidyl methacrylate (GMA), metallocene polypropylene (mPP), or a mixture thereof; preferably maleic anhydride, PP-g-MA or mPP, more preferably PP-g-MA or mPP, and yet more preferably mPP.

11. The composite of any one of items 1 to 10, wherein the thermoplastic polymer is a polyolefin, polylactic acid (preferably biodegradable), polycaprolactone, poly-3-hydroxybutyrate, or a copolymer or mixture thereof, preferably a polyolefin or a copolymer or mixture thereof, more preferably polypropylene, polyethylene, polybutylene, or a copolymer or mixture thereof, and most preferably polypropylene.
12. The composite of any one of items 1 to 11, wherein the compatibilizer is present at a concentration between about 1 wt % to about 5 wt %, preferably between about 2.5 wt % to about 5 wt %, and more preferably of about 5 wt %, based on the total weight of the biopolymer composite.
13. The composite of any one of items 1 to 12, wherein the thermoplastic polymer is present at a concentration between about 30 wt % and about 98 wt %, preferably between about 60 wt % to about 80 wt %, and more preferably of about 70 wt %, based on the total weight of the biopolymer composite.
14. The composite of any one of items 1 to 13, wherein the compatibilizer is a thermoplastic polymer.
15. The composite of 14, wherein the compatibilizer and thermoplastic polymer are present at a total concentration between about 31 wt % and about 99 wt %, preferably between about 65 wt % to about 95 wt %, more preferably of about 75 wt % to about 95%, and most preferably of about 90 wt % to about 95 wt %, based on the total weight of the biopolymer composite.
16. The composite of any one of items 1 to 15, wherein the composite consists of the components a) to e).
17. The composite of any one of items 1 to 15, wherein the composite further comprises: f) one or more additives.
18. The composite of item 17, wherein the one or more additives is one or more of:
    a slip agent (preferably from 0 wt % to about 6 wt %),
    an anti-block (preferably from 0 wt % to about 4 wt %),
    an anti-static agent (preferably from 0 wt % to about 4 wt %),
    a pigment (preferably from 0 wt % to about 5 wt %),
    a flame retardant (preferably from 0 wt % to about 6 wt %),
    an antioxidant (preferably from 0 wt % to about 3 wt %),
    an acid scavenger (preferably from 0 wt % to about 4 wt %),
    an UV light stabilizer (preferably from 0 wt % to about 3 wt %),
    a heat stabilizer (preferably from 0 wt % to about 5 wt %), and
    a cross-linking agent (preferably from 0 wt % to about 4 wt %),
    all wt % being based on the total weight of the biopolymer composite.
19. A method for producing the biopolymer composite of any one of items 1 to 19, wherein components a) toe) and optionally component f) as defined in any one of items 1 to 19 are brought together and compounded into the biopolymer composite.
20. The method of item 19 comprising:
    step i) providing components a) to e) and optionally component f), and
    step ii) compounding components a) to e) and optionally component f) into the biopolymer composite.
21. The method of item 20, wherein the compounding in step ii) is co-extrusion, melt-casting, injection-molding, or blown film extrusion process, preferably co-extrusion or blown film extrusion process, more preferably co-extrusion.
22. The method of item 20 or 21, wherein the compounding, preferably the co-extrusion, is carried out at a temperature between about 150° C. and about 250° C., preferably between about 160° C. and about 230° C.
23. The method of any one of items 20 to 22, wherein, in step i), components a) to e) and optionally component f) are provided separately from one another or in admixture with one another.
24. The method of any one of items 20 to 23, wherein, in step i), components a) to c) are provided in the form of a biopolymer masterbatch.
25. The method of item 24, wherein the masterbatch further comprises components d) and/or f).
26. The method of item 24 or 25, wherein the masterbatch does not comprise (is free of) component f), and component f) is provided separately from the biopolymer masterbatch in step i).
27. The method of any one of items 24 to 26, wherein the masterbatch does not comprise (is free of) components d), and component d) and is provided separately from the biopolymer masterbatch in step i).
28. The method of item 27, wherein, in step i), components d) and e) are provided separately from one another.
29. The method of item 27, wherein, in step i), components d) and e) are compounded together, before step i), so component d) is uniformly distributed within a matrix of component e).
30. The method of item 29, wherein the compounding is achieved by extrusion, melt-casting, or injection-molding, preferably extrusion.
31. The method of item 29 or 30, wherein the compounding is carried out at a temperature between about 150° C. and about 250° C.
32. Use of the biopolymer composite of any one of items 1 to 18 to produce an article.
33. An article comprising or consisting of the biopolymer composite of any one of items 1 to 18.
34. The article of item 33 being a packaging material, preferably a packaging film, more preferably a melt-cast packaging film, an extruded packaging film, or a blown film extruded packaging film.
35. A masterbatch for producing the biopolymer composite of any one of items 1 to 18, the masterbatch comprising:
    a) an alginate salt,
    b) chitosan, and
    c) a plasticizer,
    wherein the alginate salt, the chitosan, and the plasticizer are as defined in any one of items 1 to 18.
36. The masterbatch of item 35, being is free of a compatibilizer.
37. The masterbatch of item 35, further comprising: d) a compatibilizer, wherein the compatibilizer is as defined in any one of items 1 to 18.
38. The masterbatch of item 37, wherein the compatibilizer is present in the biopolymer masterbatch in a concentration such that, once the biopolymer masterbatch has been used with a thermoplastic polymer to produce the biopolymer composite, the compatibilizer will be at a concentration between about 1 wt % to about 5 wt %, preferably between about 2.5 wt % to about 5 wt %, and more preferably of about 5 wt %, based on the total weight of the biopolymer composite.

39. The masterbatch of item 37 or 38, wherein the compatibilizer is present in the masterbatch at a concentration between about 0.5 wt % to about 25 wt %.
40. The masterbatch of any one of items 35 to 39, further comprising: f) one or more additives
41. The masterbatch of item 40, wherein the additives are as defined in item 18.
42. The masterbatch of any one of items 35 to 41, being in the form of a mixture of powders, granules or pellets of components a) to c) and optionally components d) and f).
43. The masterbatch of item 42, wherein components a) to c) and optionally components d) and f) have particle sizes of about 1 μm to about 2 mm, preferably about 5 μm to about 2 mm, and more preferably from about 5 μm to about 150 μm.
44. The masterbatch of any one of items 35 to 41, wherein component c) and optionally component d) and f) are uniformly distributed within a matrix of components a) and b).
45. Use of a biopolymer masterbatch as defined in any one of items 35 to 44 for producing a biopolymer composite as defined in any one of items 1 to 18.
46. A method of manufacturing a biopolymer masterbatch as defined in any one of items 35 to 43, the method comprising mixing components a) to c) and optionally components d) and f) together, or
47. A method of manufacturing a biopolymer masterbatch as defined in item 44, the method comprising compounding components a) to c) and optionally components d) and f) so that component c) and optionally component d) and f) are uniformly distributed within a matrix of components a) and b).
48. The method of item 47, wherein the compounding is effected at a temperature between 120° C. and 250° C., between about 150° C. and about 200° C.
49. A kit for producing the biopolymer composite of any one of items 1 to 18, the kit comprising components a) to c) and optionally components d) to f).
50. The kit of item 49, comprising component d).
51. The kit of item 49, being free of component d).
52. The kit of any one of items 49 to 51, comprising component e).
53. The kit of any one of items 49 to 51, being free of component e).
54. The kit of any one of items 49 to 53, comprising component f).
55. The kit of any one of items 49 to 53, being free of component f).
56. The kit of item 49, further comprising instructions to produce the biopolymer composite from components a) to e) and optionally f).
57. The kit of item 49, wherein the instructions comprise carrying out a method as defined in any of items 19 to 31.
58. The kit of item 49, wherein components a) to c) and optionally components d) and f) are provided in the form of a biopolymer masterbatch defined in any one of items 35 to 44.

DETAILED DESCRIPTION OF THE INVENTION

Figure 1:
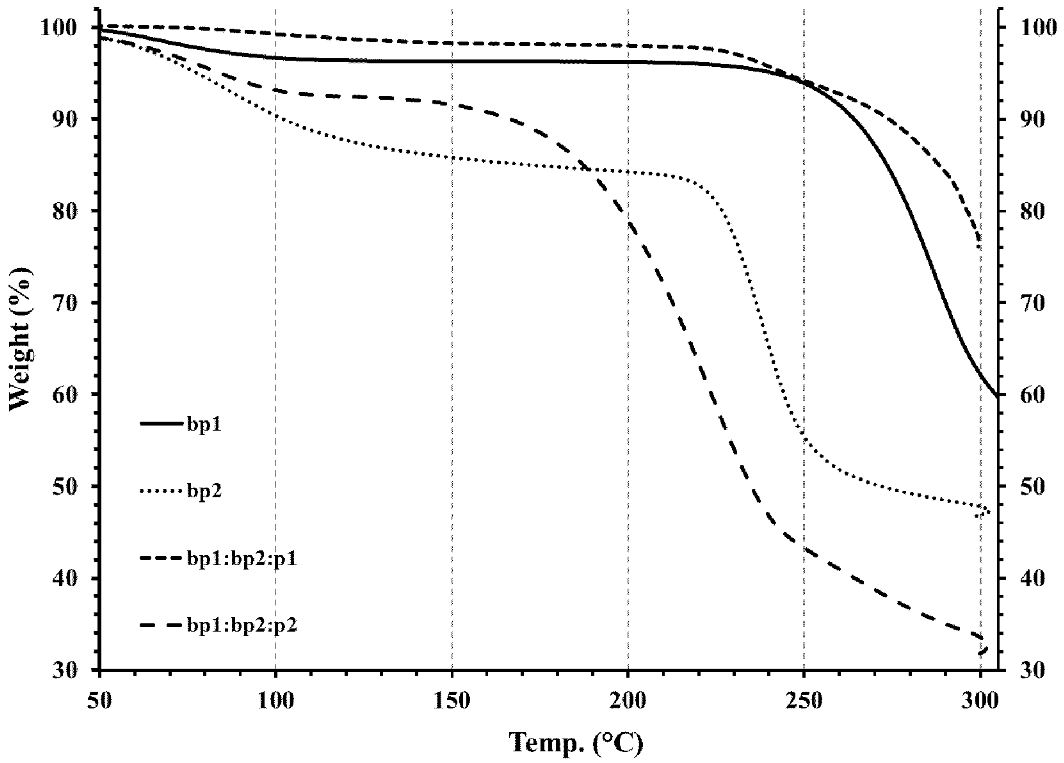
FIG. 1 shows the thermogravimetric analysis (TGA) data for the extruded biopolymer:plasticizer blends.

Turning now to the invention in more details, there is provided a biopolymer composite. There is also provided a biopolymer masterbatch which, when used in conjunction with a thermoplastic polymer, allows producing the biopolymer composite. Both the biopolymer composite and the biopolymer masterbatch comprise biopolymers, which can advantageously be sustainably-sourced, e.g. from marine by-products. The biopolymer composite is thus as a biosynthetic composite material, and more specifically a biopolymer/thermoplastic polymer composite material.

The present invention was developed with the aim to incorporate biodegradable components into thermoplastic polymers such as polyolefins. Such composites would be useful to produce various articles including e.g. melt-cast polyolefin films and in particular melt-cast polypropylene (CPP) films, which are often used for packaging applications. The invention allows replacing a significant percentage of the thermoplastic polymer from the final product by biopolymers, thus yielding the biopolymer composite, for example as a film of a biopolymer/thermoplastic polymer composite material. Thus, the present invention provides, among others, sustainable packaging materials.

This is a novel approach. It could lead to a new generation of sustainable packaging materials retaining key benefits of the existing plastic-based packaging while incrementally using less plastic.

Most importantly, the biopolymer masterbatch and the biopolymer composite are both stable at temperature required for processing of thermoplastics (e.g. >200° C.), allowing their compounding e.g. extrusion and melt-casting—see Example 1. Indeed, extrusion is currently the most economical and scalable approach for the preparation of packaging materials. It was a challenge to prepare a biopolymer masterbatch that could be processed with polypropylene (PP), for example by extrusion, given the extrusion temperature required for PP can have detrimental effects on many biopolymers. However, the biopolymer masterbatch of the invention can be successfully extruded with PP. In fact, both the biopolymer masterbatch and the biopolymer composite have a high degree of thermal stability at elevated temperature (e.g. >200° C.). For example, the biopolymer composite may suffer only little or no weight loss when heated at a temperature of 200° C. In embodiments, the biopolymer composite loses no more than about 25%, preferably no more than about 20%, more preferably no more than about 15%, yet more no more than about preferably 10%, even more preferably no more than about 5%, and most preferably no more than about 2.5% of its weight when heated at 200° C., preferably at 220° C., and more preferably at 250° C. As a result, the biopolymer masterbatch can seamlessly integrate into the polypropylene. Neither the biopolymer masterbatch nor the biopolymer composite showed any visible discoloration after extrusion and both had a uniform and smooth surface.

As also demonstrated in Example 1, the qualities of the polypropylene were maintained. Indeed, the biopolymer composite retains the strength and mechanical properties of the synthetic plastic packaging films.

The person skilled in the art is well aware of the challenges associated with homogeneous blending of polymers. Polymer blends often result in phase separation and the accompanying loss of mechanical properties. To arrive at the present invention, the low compatibility of biopolymers with less polar or hydrophobic polymers like thermoplastics/polyolefins/polypropylene had to be overcome, especially since two biopolymers are comprised in the biopolymer masterbatch.

It is also postulated that, by increasing the portion of biodegradable components, the gas barrier properties of the packaging would be enhanced, which would enhance food product protection through reduced degradation and therefore improved shelf life. The expected advantages of this technology can be summarized as follows:

- Reducing waste by replacing plastic with biodegradable materials. In other words, incorporation of biopolymers should impart biodegradability to the biopolymer composite.
- Converting non-recyclable packaging materials to recyclables. Indeed, improving the gas barrier properties of the material would reduce the need for multi-layers of high barrier plastic coatings/films and thus improve the likelihood of recycling.
- Thus, this technology should contribute towards a sustainable supply chain by maximizing the positive value of food packaging and minimizing their environmental impacts, while retaining the same or greater benefits to reducing food waste.

Biopolymer Composite

The biopolymer composite of the invention comprises:

a) an alginate salt,
b) chitosan,
c) a plasticizer,
d) a compatibilizer, and
e) a thermoplastic polymer.

wherein the alginate salt, the chitosan, the plasticizer and the compatibilizer are dispersed in a matrix of the thermoplastic polymer.

The biopolymer composite of the invention is a compatible blend of several polymers, i.e. the alginate salt, the chitosan and the thermoplastic polymer. Herein, a "compatible polymer blend" is, as well-known in the art, an immiscible polymer blend that exhibits macroscopically uniform physical properties. More specifically, the composite exhibits a co-continuous biphasic morphology, preferably wherein the alginate salt and the chitosan are homogenously distributed in the thermoplastic polymer.

Chitosan is a non-toxic, biodegradable and natural biopolymer consisting of 1,4-linked 2-amino-deoxy-β-D-glucan. It also possesses various highly value-added functionalities such as, excellent film formation properties, antimicrobial and antifungal activities. It is produced by deacetylating chitin, which is a biopolymer and is a primary component of cell walls in fungi, the exoskeletons of arthropods, such as crustaceans and insects, the radulae of molluscs, cephalopod beaks, and the scales of fish and Lissamphibia's. Typically, chitosan is made by treating the chitin shells of shrimp and other crustaceans with an alkaline substance, like sodium hydroxide. The chitosan may be any chitosan irrespective of its molecular weight (Mw), degree of deacetylation (DDA), and the provenance of the chitin used in its manufacture. In preferred embodiments, the degree of deacetylation of the chitosan ranges from about 60 to about 98%, preferably from about 75% to about 95%, and more preferably from about 80 to about 85%. In preferred embodiments, the molecular weight of the chitosan ranges from about 100 kDa to about 700 kDa, preferably from about 100 kDa to about 500 kDa, and more preferably from about 300 kDa to about 375 kDa.

Alginate salts, including e.g. sodium alginate, potassium alginate, and calcium alginate, are metal salts of the biopolymer alginic acid. Also called algin, alginic acid is a polysaccharide distributed widely in the cell walls of brown algae as well as capsular polysaccharides in bacteria. It is composed of a family of linear binary copolymers, consisting of (1→4) linked β-D-mannuronic acid (M) and α-L-guluronic acid (G) residues. The alginate salt in the invention salt may be any alginate salt irrespective of its molecular weight and the provenance of the alginic acid used in its manufacture. A preferred alginate salt is sodium alginate. In preferred embodiments, the molecular weight of the alginate salt, preferably sodium alginate, ranges from about 150 kDa to about 900 kDa, and preferably from about 300 kDa to about 700 kDa.

It was found that the alginate salt significantly improved polymer blend's melt strength during processing. The biopolymer composites demonstrated significantly higher elongation at break as compared to polypropylene composites based on chitosan alone. In addition, it was found that alginate salt particles could be dispersed to much finer fractions using traditional techniques, as compared to chitosan, which enhanced polymer composite processing and final product properties and quality. Further, lower market price for alginate salt as compared to that of chitosan positively affect end product's costs.

In embodiments, the chitosan and the alginate salt are present at a chitosan:alginate salt weight ratio of about 50:50 to about 99.5:0.5, preferably about 50:50 to about 99:1, more preferably of about 65:35 to about 85:15, and most preferably of about 75:25.

In embodiments, the plasticizer is polyethylene glycol (PEG), polypropylene glycol (PPG), glycerol, or a mixture thereof. The polyethylene glycol may be any polyethylene glycol irrespective of its molecular weight. Preferably, the plasticizer is polyethylene glycol.

In embodiments, the plasticizer is present at a concentration between about 1 wt % to about 60 wt %, preferably between about 1 wt % to about 50 wt %, more preferably between about 20 wt % to about 50 wt %, and most preferably of about 25 wt %, based on the total weight of the chitosan and the alginate salt.

In embodiments, the chitosan, the alginate salt, and the plasticizer are present at a total concentration of about 1 wt % to about 65 wt %, preferably about 5 wt % to about 50 wt %, more preferably of about 5 wt % to about 25 wt %, and most preferably of about 5 wt % to about 10 wt %, based on the total weight of the biopolymer composite.

The plasticizers impart flexibility. The above plasticizers and the biopolymer are compatible which allows obtaining desirable mechanical properties for the biopolymer composite especially since two biopolymers (the alginate salt and chitosan) are used.

In embodiments, the compatibilizer is maleic anhydride, polypropylene-grafted-maleic anhydride (PP-g-MA), epoxy styrene-acrylic oligomers (ESAO), poly(ethylene-co-octene), polyvinyl alcohol (PVA), polyvinyl acetate, poly (ethylene-co-vinyl alcohol), glycidyl methacrylate (GMA), metallocene polypropylene (mPP), or a mixture thereof; preferably maleic anhydride, PP-g-MA or mPP, more preferably PP-g-MA or mPP, and yet more preferably mPP.

The compatibilizer helps to disperse and evenly distribute the alginate salt, the chitosan and the plasticizer within the thermoplastic polymer matrix.

In embodiments, the thermoplastic polymer is a polyolefin, polylactic acid (preferably biodegradable), polycaprolactone, poly-3-hydroxybutyrate, or a copolymer or mixture thereof, preferably a polyolefin or a copolymer or mixture thereof, more preferably polypropylene, polyethylene, polybutylene, or a copolymer or mixture thereof, and most preferably polypropylene. In embodiments, the thermoplastic polymer is advantageously obtained from post-consumer or post-industrial sources.

In embodiments, the compatibilizer is present at a concentration between about 1 wt % to about 5 wt %, preferably between about 2.5 wt % to about 5 wt %, and more preferably of about 5 wt %, based on the total weight of the biopolymer composite.

In embodiments, the thermoplastic polymer is present at a concentration between about 30 wt % and about 98 wt %, preferably between about 60 wt % to about 80 wt %, and more preferably of about 70 wt %, based on the total weight of the biopolymer composite.

Some compatibilizers are also thermoplastic polymer. Examples of such compatibilizers include polyvinyl alcohol (PVA), polyvinyl acetate, and metallocene polypropylene (mPP). In such embodiments, the compatibilizer can replace part or all of the thermoplastic polymer. In such embodiments, the compatibilizer and thermoplastic polymer are present at a total concentration between about 31 wt % and about 99 wt %, preferably between about 65 wt % to about 85 wt %, and more preferably of about 75 wt % to about 95%, and most preferably of about 90 wt % to about 95 wt %, based on the total weight of the biopolymer composite.

In embodiments, the biopolymer composite consists of the components a) to e).

In other embodiments, the biopolymer composite further comprises:

f) one or more additives.

Non-limiting examples of such additives include:

- slip agents (preferably from 0 wt % to about 6 wt %),
- anti-block (preferably from 0 wt % to about 4 wt %),
- anti-static agents (preferably from 0 wt % to about 4 wt %),
- pigments (preferably from 0 wt % to about 5 wt %),
- flame retardants (preferably from 0 wt % to about 6 wt %),
- antioxidants (preferably from 0 wt % to about 3 wt %),
- acid scavengers (preferably from 0 wt % to about 4 wt %),
- UV light stabilizers (preferably from 0 wt % to about 3 wt %),
- heat stabilizers (preferably from 0 wt % to about 5 wt %), and
- cross-linking agents (preferably from 0 wt % to about 4 wt %), all wt % being based on the total weight of the biopolymer composite. All these additives are well-known to the skilled person.

In embodiments, the biopolymer composite is produced as described below.

Manufacture of the Biopolymer Composite

There is also provided herein a method for producing the biopolymer composite as described above. In this method, the components a) to f) as defined above are brought together and compounded into the biopolymer composite.

More specifically, in embodiments, the method comprises:

step i) providing components a) to e) and optionally component f), and step ii) compounding components a) to e) and optionally component f) into the biopolymer composite.

It will be apparent to the skilled person that component f) will only be used in this method when a biopolymer composite comprising such component (i.e. additive) is desired.

The compounding can be carried by various well-known polymer compounding processes as long as the temperature is at most about 250° C. In preferred embodiments, the compounding in step ii) is co-extrusion, melt-casting, injection-molding, or blown film extrusion process. In preferred embodiments, the compounding in step ii) is co-extrusion or blown film extrusion process, more preferably co-extrusion.

Therefore, in embodiments, the biopolymer composite can be in the form of a pellet (e.g. such as that form by extrusion) or a film (such as that formed by blown film extrusion process).

Note that the biopolymer composite can be first produced in one form and then compounded again into another form. For example, an extruded pellet can be formed, and maybe stored for some time, and then re-compounded into an article, such as a film (e.g. formed by blown film extrusion process).

In preferred embodiments, the compounding, preferably the co-extrusion, is carried out at a temperature between about 150° C. and about 250° C., preferably between about 160° C. and about 230° C.

In embodiments, in step i) of the above method, components a) to e) and optionally component f) are provided separately from one another or in admixture with one another. These components can be provided in the form of powders, pellets, granules, and the like.

In alternative embodiments, components a) to c) are provided in the form of a biopolymer masterbatch as described below. The biopolymer masterbatch may or may not further comprise components d) and f). In embodiments in which the biopolymer masterbatch does not comprise (is free of) components d) and f), these components will be provided separately from the biopolymer masterbatch in step i) of the above method. In all cases, component e) will also be provided separately from the biopolymer masterbatch in step i).

More specifically, in embodiments in which the biopolymer masterbatch does not comprise (is free of) component d), in step i), components d) and e) can be:

- provided separately from one another or
- compounded together, before step i), so component d) is uniformly distributed within a matrix of component e).

The latter can be achieved e.g. by extrusion, melt-casting, or injection-molding, preferably extrusion. This compounding (preferably extrusion) is preferably carried out at a temperature between about 150° C. and about 250° C.

In the above, it should be understood that component f) (optional additive(s)) will be absent from the method if a biopolymer composite free of such optional additive(s) is desired.

Use of the Biopolymer Composite

The biopolymer composite described above can be formed into various articles. Given its high degree of thermal stability at elevated temperature (e.g. >200° C.), the biopolymer composite can be formed into the article using a variety of well-known processes including extrusion, melt-casting, or injection-molding.

In embodiments, the biopolymer composite is formed into a film, which can be used, for example, as a packaging material, for example a packaging film. It can also be used to as part of a packaging material, for example as one layer in a multi-layered packaging film.

Herein, there is thus provided an article, including a packaging material, preferably a packaging film, more preferably a melt-cast packaging film, an extruded packaging film, or a blown film extruded packaging film, that comprises or consists of the biopolymer composite.

Masterbatch for Producing the Composite and its Manufacture

In another aspect of the invention, there is also provided a masterbatch for producing the biopolymer composite described above. There is further provided a method of manufacturing this biopolymer masterbatch.

Herein, the term "masterbatch" has its ordinary meaning in the art. For certainty, a masterbatch is an additive added to a polymer (herein the thermoplastic polymer component e)) used for imparting one or more properties to said polymer. As such, it is understood that the biopolymer masterbatch will be used with component e) as described above to produce the biopolymer composite.

The biopolymer masterbatch of the invention comprises:

a) an alginate salt, b) chitosan, c) a plasticizer, wherein the alginate salt, the chitosan, and the plasticizer are as described above and are present in the same concentrations/weight ratios.

In embodiments, the biopolymer masterbatch further comprises:

d) a compatibilizer.

wherein the compatibilizer is as described above.

The compatibilizer is present in the biopolymer masterbatch in a concentration such that, once the biopolymer masterbatch has been used with the thermoplastic polymer to produce the biopolymer composite, the compatibilizer will be at a concentration between about 1 wt % to about 5 wt %, preferably between about 2.5 wt % to about 5 wt %, and more preferably of about 5 wt %, based on the total weight of the biopolymer composite.

In embodiments, the compatibilizer is present in the masterbatch at a concentration between about 0.5 wt % to about 25 wt %.

In other embodiments, the biopolymer masterbatch is free of the compatibilizer. Rather, the compatibilizer is added separately during the manufacture of the biopolymer composite as described above.

In embodiments, the biopolymer masterbatch further comprises:

f) one or more additives, wherein the additives are as described above. Herein, it should be understood that component f) will be absent from the biopolymer masterbatch if a biopolymer composite free of such optional additive(s) is desired. Thus, in embodiments, the biopolymer masterbatch consists of the components a) to c) or of the components a) to d).

In preferred embodiments, the biopolymer masterbatch is in the form of a mixture of powders, granules or pellets of components a) to c) and optionally components d) and f). In embodiments, these components have particle sizes of about 1 μm to about 2 mm, preferably about 5 μm to about 2 mm, and more preferably from about 5 μm to about 150 μm. Such a masterbatch can be obtained by simply mixing its constituting components together.

In alternative embodiments, components a) to c) and optionally components d) and f) are compounded together so that components c) and optionally component d) and f) are uniformly distributed within a matrix of components a) and b). Preferably such compounding is effected at high temperature, for example. This compounding may be achieved by extrusion, melt-casting, or injection-molding (preferably extrusion). In embodiments, the compounding (preferably extrusion) is carried out at a temperature between 120° C. and 250° C., preferably between about 150° C. and about 200° C. In such embodiments, the masterbatch is a miscible polymer blend (also called an homogeneous polymer blend), in which the various components of the blends are contained within a single phase.

In embodiments, the biopolymer masterbatch in the form of a pellet, preferably an extruded pellet.

There is also provided herein, the use of the biopolymer masterbatch for producing the biopolymer composite, preferably according to the method described above.

Kit for Producing the Biopolymer Composite

There is also provided herein a kit for producing the biopolymer composite, this kit comprises components a) to c) and optionally components d) to f).

Preferably, the kit comprises component d). In alternative embodiments, the kit does not comprise (is free of) component d).

Preferably, the kit does not comprise (is free of) component e). In alternative embodiments, the kit comprises component e).

Preferably, the kit comprises component f). In alternative embodiments, the kit does not comprise (is free of) component f).

In embodiments in which a component of the biopolymer composite is not provided in the kit, this component will be provided separately by the user of the kit.

In embodiments, the kit also comprises instructions to produce the biopolymer composite from components a) to e) and optionally f). In preferred embodiments, these instructions comprise carrying out the method described in the previous section.

In embodiments, the components in the kit are provided separately from one another and in admixture with one another. For example, they can be provided in the form of as powders, pellets, granules, and the like.

In alternative embodiments, components a) to c) are provided in the form of a biopolymer masterbatch as described above. This biopolymer masterbatch may or may not further comprise components d) and f). In embodiments in which the biopolymer masterbatch does not comprise (is free of) components d) and f), component d) and optionally component f) will be provided separately from the biopolymer masterbatch either in the kit or by the user of the kit.

More specifically, in embodiments in which the biopolymer masterbatch does not comprise (is free of) component d), components d) and e) can be provided separately from one another or they can be compounded together so component d) is uniformly distributed within a matrix of component e). Preferably, when components d) and e) are compounded together, they are provided as such in the kit. Alternatively, the kit may be free of components d) and e) and comprises instructions to compound these components together so component d) is uniformly distributed within a matrix of component e), preferably using the process for doing so described in the previous section.

In the above, it should be understood that component f) (optional additive(s)) will be absent from the kit and its instructions if a biopolymer composite free of such optional additive(s) is desired.

Definitions

The use of the terms "a" and "an" and "the" and similar referents in the context of describing the invention (especially in the context of the following claims) are to be construed to cover both the singular and the plural, unless otherwise indicated herein or clearly contradicted by context.

The terms "comprising", "having", "including", and "containing" are to be construed as open-ended terms (i.e., meaning "including, but not limited to") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. All subsets of values within the ranges are also incorporated into the specification as if they were individually recited herein.

All methods described herein can be performed in any suitable order unless otherwise indicated herein or otherwise clearly contradicted by context.

The use of any and all examples, or exemplary language (e.g., "such as") provided herein, is intended merely to better illuminate the invention and does not pose a limitation on the scope of the invention unless otherwise claimed.

No language in the specification should be construed as indicating any non-claimed element as essential to the practice of the invention.

Herein, the term "about" has its ordinary meaning. In embodiments, it may mean plus or minus 10% or plus or minus 5% of the numerical value qualified.

Unless otherwise defined, all technical and scientific terms used herein have the same meaning as commonly understood by one of ordinary skill in the art to which this invention belongs.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

We report below a thermo stable composite biopolymer formulation (BPF) that can seamlessly integrate into PP (polypropylene), without diminishing film properties. The BPF can be produced under the demanding industrial standard processing conditions (of polymer extrusion), including high temperature and pressure, without degradation. The BPF exhibited high thermal stability (>200° C.), excellent integration with PP (homogenous blending), with strong potential for a scale-up to pilot/industrial scale. The BPF is compatible for extrusion with polypropylene (PP). The proof-of-concept development of BPF, required optimizing formulations to endure high extrusion temperature typical of PP without structural degradation and adverse effect on opacity (thermally stable at >200° C.).

The trials performed indicate that biopolymers could be successfully incorporated into the polymer (PP) matrix and even replace a significant portion of PP-based articles. The work has illustrated that it is possible to impart biodegradable element, while retaining functionality of films, thereby giving the desired environmental benefits on both fronts.

Materials

Herein below, the following materials were used:

- PP—polypropylene ExxonMobil® PP9513 random copolymer, 0.90 density and MFR of 7.3 g/10 mins,
- bp1—Biopolymer 1: chitosan $M_w$ 300-375 kDA (CS);
- bp2—Biopolymer 2: sodium alginate (Alg);
- p1—Plasticizer 1: polyethylene glycol (PEG) $M_n$ 20 kDa (Sigma Aldrich 81300);
- p2—Plasticizer 2: glycerol,
- c1—compatibilizer 1: polypropylene-grafted-maleic anhydride (PP-g-MA) $M_w$~9.1 kDa and $M_n$~3.9 kDa, Sigma® 427845; and
- c2—compatibilizer 2: metallocene polypropylene (mPP), Total Petrochemicals Lumicene® M6571, 0.90 density and MFR 9.0 g/10 mins.

Glossary

Herein below, the following acronyms are used:

- wt %—weight percent,
- BPF—the two biopolymers (alginate (bp2) and chitosan (bp1)) with a plasticizer,
- μBPF—micronized BPF, and
- BPF:PP—BPF with polypropylene and compatibilizer (i.e. the composite of the invention).

Approach

Priority was given to ensure the thermal stability of the formulation alone in demanding extrusion conditions. As a result, extrusion was carried out under various processing conditions (i.e. temperature, feed ratio, biopolymer physicochemistry, shaft speed etc.) to find the optimal processing configuration for the BPF.

After optimizing the processing condition, the focus shifted to ensure high compatibility or homogeneous blending of BPF with PP, so that no phase separation occurs in the final product. Use of plasticizers (p1 and p2) and compatibilizers ultimately allowed seamless integration of BPF with PP.

Plasticizers allowed to overcome the rigid crystalline phase of the biopolymers and to obtain a deformable phase. In addition, plasticization in the "molten" state could be achieved through thermo-mechanical kneading, and production of biopolymer-based films using this technique may approach industrial fabrication conditions.

Compatibilizers were used to facilitate homogeneous distribution of biopolymers over the PP. These compounds were utilized in reactive extrusion with a dual goal, homogeneous distribution of biopolymer over the PP matrix and avoiding migration out of the matrix. The extruded BPF:PP not only exhibited high thermal stability but there was no phase separation.

At every step of the development, relevant tests (described below) were carried out to ensure the reproducibility of the product.

As mentioned, preparatory parameters for BPF:PP such as incorporation rate of BPF, plasticizer, compatibilizer, extrusion method were varied for optimal performance. For this purpose, the testing/analysis performed to determine success of both BPF and PP blending included:

i) Visual/qualitative assessment for color (presence of discoloration) and uniformity or surface smoothness.
ii) TGA (Perkin Elmer® STA 8000) to assess thermal stability and mass loss during extrusion. This technique is based on monitoring the mass of a substance as a function of temperature or time. The sample specimen is subjected to a controlled temperature program under controlled atmosphere.
iii) Particle size analysis was performed using a Malvern® M3000 for monitoring physicochemical characteristics of the preparatory materials.
iv) SEM (Pemtron® Co. Ltd. PS 230) was carried out for the assessment of product morphology, homogeneity and distribution of BPF in composite material at the nanoscale.
v) XRD (Bruker® D8 Advance XRD) to monitor the arrangement and interactions at the molecular level for the composite product.

COMPARATIVE EXAMPLES—BIOPOLYMERS:PLASTICIZER BLENDS (BPF)

Biopolymer mixtures containing both chitosan (bp1) and sodium alginate (bp2) were used to impart a biodegradable component to polypropylene. Various biopolymers:plasticizer blends (BPF) with a bp1:bp2 weight ratios of either 50:50 or 75:25 and using either PEG (p1) or glycerol (p2) (at varying concentrations, from 5% to 25%, at 30% clogging occurred) as a plasticizer were tested. The two plasticizers alone as well as the various biopolymers:plasticizer blends (BPF) were extruded with a barrel temperature profile ranging from 135-165° C. for stability testing.

Several plasticizer concentrations were tested with the objective to carry out a smooth extrusion (no clogging) and at same time get a homogenous distribution of BPF in the PP matrix. The minimum plasticizer concentration that fulfilled both these requirements was chosen for further tests. This concentration was 25 wt % (based on the total weight of the BPF blend).

These preliminary tests revealed that the blends with a bp1:bp2 weight ratio of 75:25 was preferable based on thermal stability of bp1 and bp2.

Furthermore, thermogravimetric analysis (TGA) analysis of the BPF revealed excellent performances for all blends, with superior performance of p2 compared to p1, where an earlier onset of decomposition was observed with the latter (FIG. 1). Indeed, there is limited weight loss (degradation) at elevated temperature (>150° C., and even >200° C.) for all blends. In particular, the CS:Alg:PEG (CS:Alg:PEG with a CS:Alg weight ratio of 75:25 and a (CS:Alg):PEG weight ratio of 50:50, denoted as bp1:bp2:p1) had very little weight loss up to around 220° C. A similar blend denoted bp1:bp2:p2 (i.e. CS:Alg:glycerol with a CS:Alg weight ratio of 75:25 and a (CS:Alg):glycerol weight ratio of 50:50) had little weight loss up to around 150° C.

Figure 2:
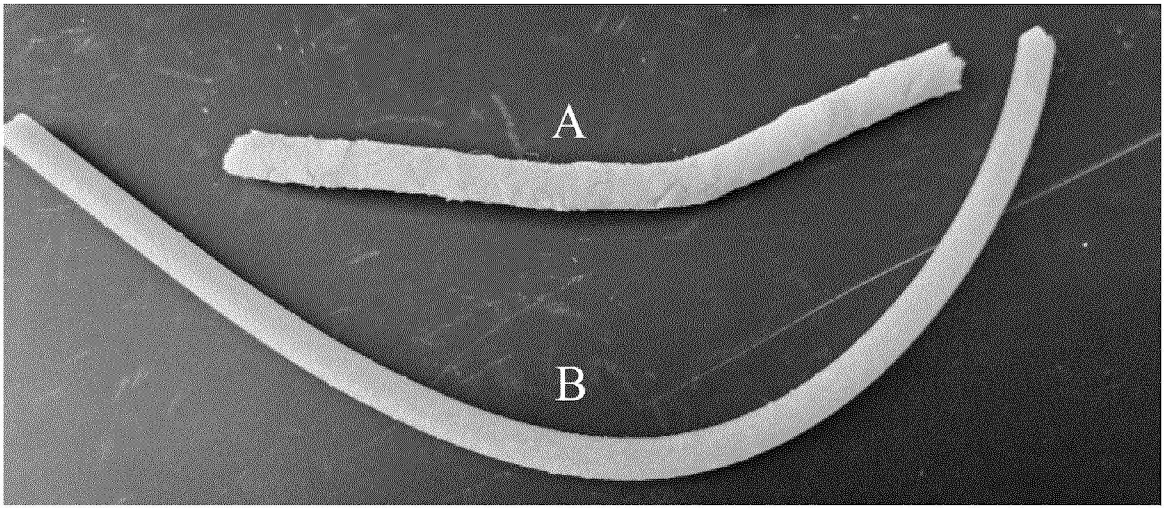
FIG. 2 shows the extruded BPF strands utilizing (A) p1 and (B) p2.

As can be seen in FIG. 2, the bp1 and bp2 75:25 mixture was more compatible with p2 (in B) than p1 (in A). Some discoloration was observed in the extruded BPFs.

Examples 1-12—Biopolymers:Plasticizer:Compatibilizer:PP Blends

Biopolymers:plasticizer:compatiblizer:PP blends were produced using the above BPF at various concentrations, PP and two compatibilizers, PP-g-MA or mPP, also at various concentrations, were tested. In particular, the formulations of Examples 1-14 described below (and summarized in Table 1) were tested.

Comparative Example 1 (No Compatibilizer)

The biopolymers chitosan and sodium alginate were mixed in a weight ratio of 50:50, and the combined biopolymers were mixed in a weight ratio of 50:50 with glycerol as plasticizer and extruded at temperatures between 135-160° C. with the extruded strand pelletized to 3.0 mm pellets using a benchtop pelletizer to produce the BPF. The BPF was further coextruded with PP in a weight ratio of 5:95 using temperatures between 145-170° C. and an extruder screw speed of 150 rpm to produce a BPF/PP composite containing 5 wt % BPF.

Example 1

The biopolymers chitosan and sodium alginate were mixed in a weight ratio of 50:50, and the combined biopolymers were mixed in a weight ratio of 50:50 with glycerol as plasticizer and extruded at temperatures between 135-160° C. with the extruded strand pelletized to 3.0 mm pellets using a benchtop pelletizer to produce the BPF. Polypropylene grafted maleic anhydride (PP-g-MA) as compatibilizer and PP were blended in a weight ratio of 1:17 at temperatures between 150-205° C. and pelletized. The BPF was further coextruded with PP/PP-g-MA blend in a weight ratio of 5:95 using temperatures between 150-170° C. and an extruder screw speed of 150 rpm to produce a BPF/PP composite containing 5 wt % BPF.

Example 2

The biopolymers chitosan and sodium alginate were mixed in a weight ratio of 75:25, and the combined biopolymers were mixed in a weight ratio of 50:50 with polyethylene-glycol (PEG) as plasticizer to produce the BPF. mPP as compatibilizer and PP were blended in a weight ratio of 1:17 at temperatures between 150-205° C. and the extruded strand was pelletized to 2.0 mm pellets using a benchtop pelletizer. The BPF was further coextruded with mPP/PP blend in a weight ratio of 5:95 using temperatures between 150-170° C. and an extruder screw speed of 150 rpm to produce a BPF/PP composite containing 5 wt % BPF.

Example 3

The biopolymers chitosan and sodium alginate were mixed in a weight ratio of 75:25, and the combined biopolymers were mixed in a weight ratio of 50:50 with polyethylene-glycol (PEG) as plasticizer to produce the BPF. mPP as compatibilizer and PP were blended in a weight ratio of 1:17 at temperatures between 150-205° C. and the extruded strand was pelletized to 2.0 mm pellets using a benchtop pelletizer. The BPF was further coextruded with mPP/PP blend in a weight ratio of 10:90 using temperatures between 150-170° C. and an extruder screw speed of 150 rpm to produce a BPF/PP composite containing 10 wt % BPF.

Example 4

The biopolymers chitosan and sodium alginate were mixed in a weight ratio of 75:25, and the combined biopolymers were mixed in a weight ratio of 50:50 with polyethylene-glycol (PEG) as plasticizer to produce the BPF. mPP as compatibilizer and PP were blended in a weight ratio of 1:17 at temperatures between 150-205° C. and the extruded strand was pelletized to 2.0 mm pellets using a benchtop pelletizer. The BPF was further coextruded with PP/mPP blend in a weight ratio of 15:85 using temperatures between 150-170° C. and an extruder screw speed of 150 rpm to produce a BPF/PP composite containing 15 wt % BPF.

Example 5

The biopolymers chitosan and sodium alginate were mixed in a weight ratio of 75:25, and the combined biopolymers were mixed in a weight ratio of 50:50 with polyethylene-glycol (PEG) as plasticizer to produce the BPF. mPP as compatibilizer and PP were blended in a weight ratio of 1:17 at temperatures between 150-205° C. and the extruded strand was pelletized to 2.0 mm pellets using a benchtop pelletizer. The BPF was further coextruded with mPP/PP blend in a weight ratio of 20:80 using temperatures between 150-170° C. and an extruder screw speed of 150 rpm to produce a BPF/PP composite containing 20 wt % BPF.

Example 6

The biopolymers chitosan and sodium alginate were mixed in a weight ratio of 75:25, and the combined biopolymers were mixed in a weight ratio of 50:50 with polyethylene-glycol (PEG) as plasticizer to produce the BPF. mPP as compatibilizer and PP were blended in a weight ratio of 1:17 at temperatures between 150-205° C. and the extruded strand was pelletized to 2.0 mm pellets using a benchtop pelletizer. The BPF was further coextruded with mPP/PP blend in a weight ratio of 25:75 using temperatures between 150-170° C. and an extruder screw speed of 150 rpm to produce a BPF/PP composite containing 25 wt % BPF.

Comparative Example 2 (No Compatibilizer)

The biopolymers chitosan and sodium alginate were mixed in a weight ratio of 75:25, and the combined biopolymers were mixed in a weight ratio of 50:50 with polyethylene-glycol (PEG) as plasticizer to produce the BPF. The BPF was further coextruded with PP in a weight ratio of 5:95 using temperatures between 160-230° C. and an extruder screw speed of 100 rpm to produce a BPF/PP composite containing 5 wt % BPF.

Example 7

The biopolymers chitosan and sodium alginate were mixed in a weight ratio of 75:25, and the combined biopolymers were mixed in a weight ratio of 50:50 with polyethylene-glycol (PEG) as plasticizer to produce the BPF. mPP as compatibilizer and PP were blended in a weight ratio of 1:17 at temperatures between 150-205° C. and the extruded strand was pelletized to 2.0 mm pellets using a benchtop pelletizer. The BPF was further coextruded with PP/mPP blend in a weight ratio of 20:80 using temperatures between 160-220° C. and an extruder screw speed of 150 rpm to produce a BPF/PP composite containing 20 wt % BPF.

Example 8

The biopolymers chitosan and sodium alginate with an average particle size of <63 μm were mixed in a weight ratio of 75:25, and the combined biopolymers were mixed in a weight ratio of 75:25 with polyethylene-glycol (PEG) as plasticizer to produce the BPF. mPP as compatibilizer and PP were blended in a weight ratio of 1:17 at temperatures between 150-205° C. and the extruded strand was pelletized to 2.0 mm pellets using a benchtop pelletizer. The BPF was further coextruded with PP/mPP blend in a weight ratio of 5:95 using temperatures between 150-175° C. and an extruder screw speed of 150 rpm to produce a BPF/PP composite containing 5 wt % BPF.

Example 9

The biopolymers chitosan and sodium alginate with an average particle size of <63 μm were mixed in a weight ratio of 75:25, and the combined biopolymers were dry mixed at room temperature in a weight ratio of 75:25 with polyethylene-glycol (PEG) as plasticizer to produce the BPF. mPP as compatibilizer and PP were blended in a weight ratio of 1:17 at temperatures between 150-205° C. and the extruded strand was pelletized to 2.0 mm pellets using a benchtop pelletizer. The BPF was further coextruded with PP/mPP blend in a weight ratio of 25:75 using temperatures between 150-175° C. and an extruder screw speed of 150 rpm to produce a BPF/PP composite containing 25 wt % BPF.

Example 10

The biopolymers chitosan and sodium alginate with an average particle size between 63-250 μm were mixed in a weight ratio of 75:25, and the combined biopolymers were mixed in a weight ratio of 75:25 with polyethylene-glycol (PEG) as plasticizer to produce the BPF. mPP as compatibilizer and PP were blended in a weight ratio of 1:17 at temperatures between 150-205° C. and the extruded strand was pelletized to 2.0 mm pellets using a benchtop pelletizer. The BPF was further coextruded with PP/mPP mixture in a weight ratio of 5:95 using temperatures between 150-175° C. and an extruder screw speed of 150 rpm to produce a BPF/PP composite containing 5 wt % BPF.

Example 11

The biopolymers chitosan and sodium alginate with an average particle size between 63-250 μm were mixed in a weight ratio of 75:25, and the combined biopolymers were mixed in a weight ratio of 75:25 with polyethylene-glycol (PEG) as plasticizer to produce the BPF. mPP as compatibilizer and PP were blended in a weight ratio of 1:17 at temperatures between 150-205° C. and the extruded strand was pelletized to 2.0 mm pellets using a benchtop pelletizer. The BPF was further coextruded with PP/mPP blend in a weight ratio of 25:75 using temperatures between 150-175° C. and an extruder screw speed of 150 rpm to produce a BPF/PP composite containing 25 wt % BPF.

Example 12—Film

The biopolymers chitosan and sodium alginate with an average particle size of <63 μm were mixed in a weight ratio of 75:25, and the combined biopolymers were mixed in a weight ratio of 75:25 with polyethylene-glycol (PEG) as plasticizer to produce the BPF. mPP as compatibilizer and PP were blended in a weight ratio of 1:17 at temperatures between 150-205° C. and the extruded strand was pelletized to 2.0 mm pellets using a benchtop pelletizer. The BPF and PP/mPP blend in a weight ratio of 5:95 was further coextruded through a film die with a die gap of approximately 0.8 mm under tension to draw down at a ratio of 10:1 using temperatures between 165-200° C. and an extruder screw speed of 150 rpm to produce a BPF/PP composite film containing approximately 5 wt % BPF and an approximate thickness of 80 μm.

Example 13—Film

The biopolymers chitosan and alginate with an average particle size of <45 μm were mixed in a ratio of 75:25 chitosan:alginate, and the combined biopolymers were mixed in a ratio of 75:25 biopolymers:PEG to produce the BPF. mPP and PP were mixed in a ratio of 1:17 and the extruded strand was pelletized to 2.0 mm pellets using a benchtop pelletizer. The BPF and PP/mPP mixture in a ratio of 5:95 BPF:PP resins was extruded through a film die with a die gap of approximately 0.25 mm under tension using temperatures between 160-200° C. and an extruder screw speed of 100 rpm to produce a BPF:PP composite film containing approximately 5 wt % BPF and thickness ranging between 180-200 μm.

Example 14—Film

The biopolymers chitosan and alginate with an average particle size of <45 μm were mixed in a ratio of 75:25 chitosan:alginate, and the combined biopolymers were mixed in a ratio of 75:25 biopolymers:PEG to produce the BPF. mPP and PP were mixed in a ratio of 1:17 and the extruded strand was pelletized to 2.0 mm pellets using a benchtop pelletizer. The BPF and PP/mPP mixture in a ratio of 5:95 BPF:PP resins was extruded through a film die with a die gap of approximately 0.25 mm under tension to draw down at a ratio of 1.66:1 using temperatures between 160-200° C. and an extruder screw speed of 50 rpm to produce a BPF:PP composite film containing approximately 5 wt % BPF and thickness ranging between 120-140 μm.

Example 15—Film

The biopolymers chitosan and alginate with an average particle size of <45 μm were mixed in a ratio of 75:25 chitosan:alginate, and the combined biopolymers were mixed in a ratio of 75:25 biopolymers:PEG to produce the BPF. mPP and PP were mixed in a ratio of 1:17 and the extruded strand was pelletized to 2.0 mm pellets using a benchtop pelletizer. The BPF and PP/mPP mixture in a ratio of 5:95 BPF:PP resins was extruded through a film die with a die gap of approximately 0.25 mm under tension to draw down at a ratio of 2.5:1 using temperatures between 160-200° C. and an extruder screw speed of 35 rpm to produce a BPF:PP composite film containing approximately 5 wt % BPF and thickness ranging between 70-80 μm.

Example 16—Film

The biopolymers chitosan and alginate with an average particle size of <45 μm were mixed in a ratio of 75:25 chitosan:alginate, and the combined biopolymers were mixed in a ratio of 75:25 biopolymers:PEG to produce the BPF. PP and mPP were mixed in a ratio of mPP and PP and the extruded strand was pelletized to 2.0 mm pellets using a benchtop pelletizer. The BPF and PP/mPP mixture in a ratio of 10:90 BPF:PP resins was extruded through a film die with a die gap of approximately 0.25 mm under tension using temperatures between 160-200° C. and an extruder screw speed of 100 rpm to produce a BPF:PP composite film containing approximately 10 wt % BPF and an approximate thickness of 250 μm.

Example 17—Film

The biopolymers chitosan and alginate with an average particle size of <45 μm were mixed in a ratio of 75:25 chitosan:alginate, and the combined biopolymers were mixed in a ratio of 75:25 biopolymers:PEG to produce the BPF. mPP and PP were mixed in a ratio of 1:17. The BPF and PP/mPP mixture in a ratio of 10:90 BPF:PP resins was extruded through a film die with a die gap of approximately 0.25 mm under tension to draw down at a ratio of 2.5:1 using temperatures between 160-200° C. and an extruder screw speed of 75 rpm to produce a BPF:PP composite film containing approximately 10 wt % BPF and thickness ranging between 200-220 μm.

Example 18—Film

The biopolymers chitosan and alginate with an average particle size of <45 μm were mixed in a ratio of 75:25 chitosan:alginate, and the combined biopolymers were mixed in a ratio of 75:25 biopolymers:PEG to produce the BPF. mPP and PP were mixed in a ratio of 1:17 and the extruded strand was pelletized to 2.0 mm pellets using a benchtop pelletizer. The BPF and PP/mPP mixture in a ratio of 10:90 BPF:PP resins was extruded through a film die with a die gap of approximately 0.25 mm under tension to draw down at a ratio of 1.25:1 using temperatures between 160-200° C. and an extruder screw speed of 50 rpm to produce a BPF:PP composite film containing approximately 10 wt % BPF and thickness ranging between 120-140 μm.

Comparative Example 3 (No Alginate)—Film

The biopolymer chitosan with an average particle size of <45 μm was mixed in a ratio of 75:25 biopolymer:PEG to produce the BPF. mPP and PP were mixed in a ratio of 1:17. The BPF and PP/mPP mixture in a ratio of 5:95 BPF:PP resins was extruded through a film die with a die gap of approximately 0.25 mm under tension to draw down at a ratio of 2.5:1 using temperatures between 160-200° C. and an extruder screw speed of 35 rpm to produce a BPF:PP composite film containing approximately 5 wt % BPF and thickness ranging between 50-250 μm.

Comparative Example 4 (No Alginate)—Film

The biopolymer chitosan with an average particle size of <45 μm was mixed in a ratio of 75:25 biopolymer:PEG to produce the BPF. mPP and PP were mixed in a ratio of 1:17. The BPF and PP/mPP mixture in a ratio of 10:90 BPF:PP resins was extruded through a film die with a die gap of approximately 0.25 mm under tension to draw down at a ratio of 2.5:1 using temperatures between 160-200° C. and an extruder screw speed of 35 rpm to produce a BPF:PP composite film containing approximately 10 wt % BPF and thickness ranging between 50-250 μm.

TABLE 1

Summary of the examples and comparative examples.

| Example | Biopolymers:Plasticizer Blends (i.e. BPF) CS:Alg wt ratio | Plasticizer | (CS:Alg):plasticizer wt ratio | Treatment | Comp.:PP Blends (i.e. PP Blend) Comp. | Comp.:PP wt ratio | Composite BPF:PP blend wt ratio | Treatment* |
|---|---|---|---|---|---|---|---|---|
| Comp. 1 | 50:50 | Glycerol | 50:50 | Mixed at 135-160° C. and pelletized | none | — | 5:95 | Coext. at 145-170° C., 150 rpm |
| 1 | 50:50 | Glycerol | 50:50 | Mixed at 135-160° C. and pelletized | PP-g-MA | 1:17 | 5:95 | Coext. at 145-170° C., 150 rpm |
| 2 | 75:25 | PEG | 50:50 | none | mPP | 1:17 | 5:95 | Coext. at 150-170° C., 150 rpm |
| 3 | 75:25 | PEG | 50:50 | none | mPP | 1:17 | 10:90 | Coext. at 150-170° C., 150 rpm |
| 4 | 75:25 | PEG | 50:50 | none | mPP | 1:17 | 15:85 | Coext. at 150-170° C., 150 rpm |
| 5 | 75:25 | PEG | 50:50 | none | mPP | 1:17 | 20:80 | Coext. at 150-170° C., 150 rpm |
| 6 | 75:25 | PEG | 50:50 | none | mPP | 1:17 | 25:75 | Coext. at 150-170° C., 150 rpm |
| Comp. 2 | 75:25 | PEG | 50:50 | none | none | — | 5:95 | Coext. at 160-230° C., 100 rpm |
| 7 | 75:25 | PEG | 50:50 | none | mPP | 1:17 | 20:80 | Coext. at 160-220° C., 150 rpm |
| 8 | 75:25 <63 μm | PEG | 75:25 | none | mPP | 1:17 | 5:95 | Coext. at 150-175° C., 150 rpm |
| 9 | 75:25 <63 μm | PEG | 75:25 | none | mPP | 1:17 | 25:75 | Coext. at 150-175° C., 150 rpm |
| 10 | 75:25 63-250 μm | PEG | 75:25 | none | mPP | 1:17 | 5:95 | Coext. at 150-175° C., 150 rpm |
| 11 | 75:25 63-250 μm | PEG | 75:25 | none | mPP | 1:17 | 25:75 | Coext. at 150-175° C., 150 rpm |
| 12 | 75:25 <63 μm | PEG | 75:25 | none | mPP | 1:17 | 5:95 | Coext. film die at 165-200° C., 150 rpm, 10:1 |
| 13 | 75:25 <45 v | PEG | 75:25 | none | mPP | 1:17 | 5:95 | Coext. film die at 160-200° C., 100 rpm |
| 14 | 75:25 <45 μm | PEG | 75:25 | none | mPP | 1:17 | 5:95 | Coext. film die at 160-200° C., 50 rpm, 1.6:1 |
| 15 | 75:25 <45 μm | PEG | 75:25 | none | mPP | 1:17 | 5:95 | Coext. film die at 160-200° C., 35 rpm, 2.5:1 |
| 16 | 75:25 <45 μm | PEG | 75:25 | none | mPP | 1:17 | 10:90 | Coext. film die at 160-200° C., 100 rpm |
| 17 | 75:25 <45 μm | PEG | 75:25 | none | mPP | 1:17 | 10:90 | Coext. film die at 160-200° C., 75 rpm, 2.5:1 |
| 18 | 75:25 <45 μm | PEG | 75:25 | none | mPP | 1:17 | 10:90 | Coext. film die at 160-200° C., 50 rpm, 1.25:1 |
| Comp. 3 | 100:0 <45 μm | PEG | 75:25 | none | mPP | 1:17 | 5:95 | Coext. film die at 160-200° C., 35 rpm, 2.5:1 |
| Comp. 4 | 100:0 <45 um | PEG | 75:25 | none | mPP | 1:17 | 10:90 | Coext. film die at 160-200° C., 35 rpm, 2.5:1 |

Comp. = compatibilizer.

Figure 3:
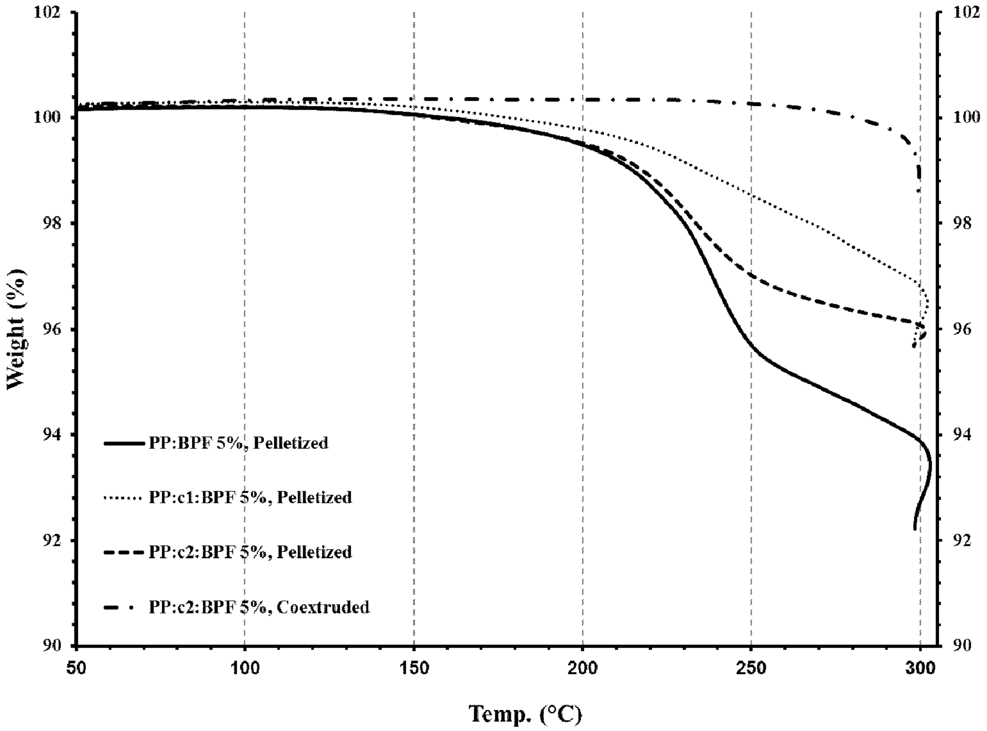
FIG. 3 shows the TGA data for comparison of the effect of compatibilizer on the thermal stability of BPF in PP after extrusion.

*rpm refer to the extruder screw speed and the ratio, if any, is the draw down ratio Observations Based on TGA data after extrusion, compatibilizers improved the thermal stability of the blend (FIG. 3). Indeed, the PP:mPP:BPF 5% coextruded formulation (Example 2, denoted "PP:c2:BFP 5%, coextruded" in FIG. 3) had no weight loss up to 250° C.

Introduction of c2 as a compatibilizer slightly increased the thermal stability, but the stability was even greater when c1 was used, with lower mass loss. This result suggested that c1 is more effective at integrating the BPF with PP.

When extruding pre-pelletized BPF with PP, it was difficult to obtain uniform distribution of the product within the entire strand of extruded material. The approach of coextruding PP with virgin (i.e. non-pelletized) BPF enabled greater control of the weight percentage of BPF added to PP.

Figure 4:
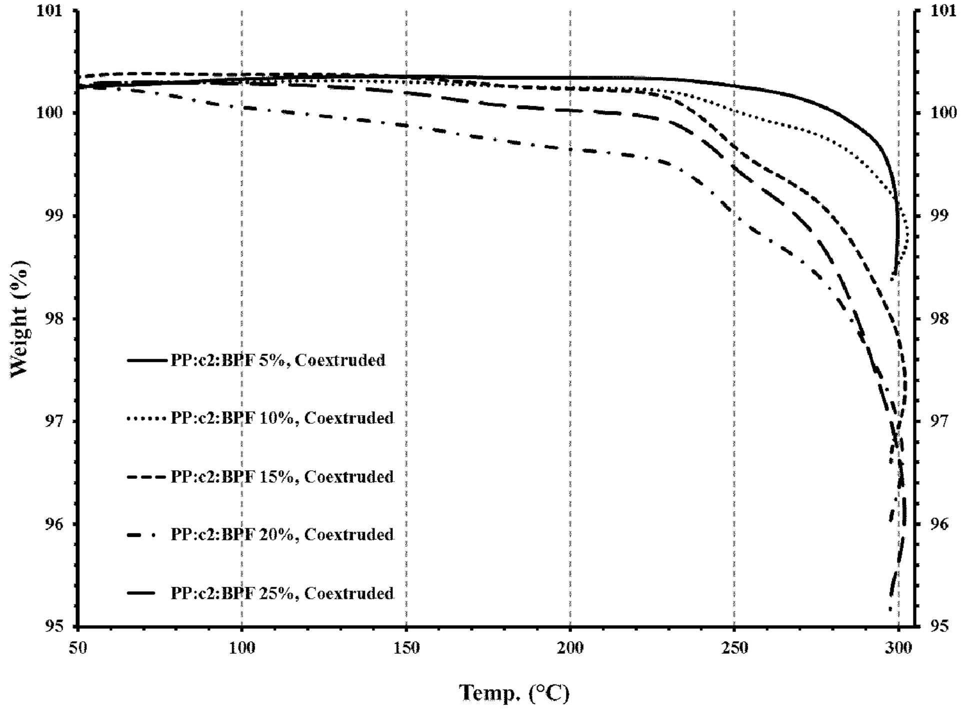
FIG. 4 shows the TGA data for a single set of replicates for incremental incorporation of BPF in PP by coextrusion.
Figure 5:
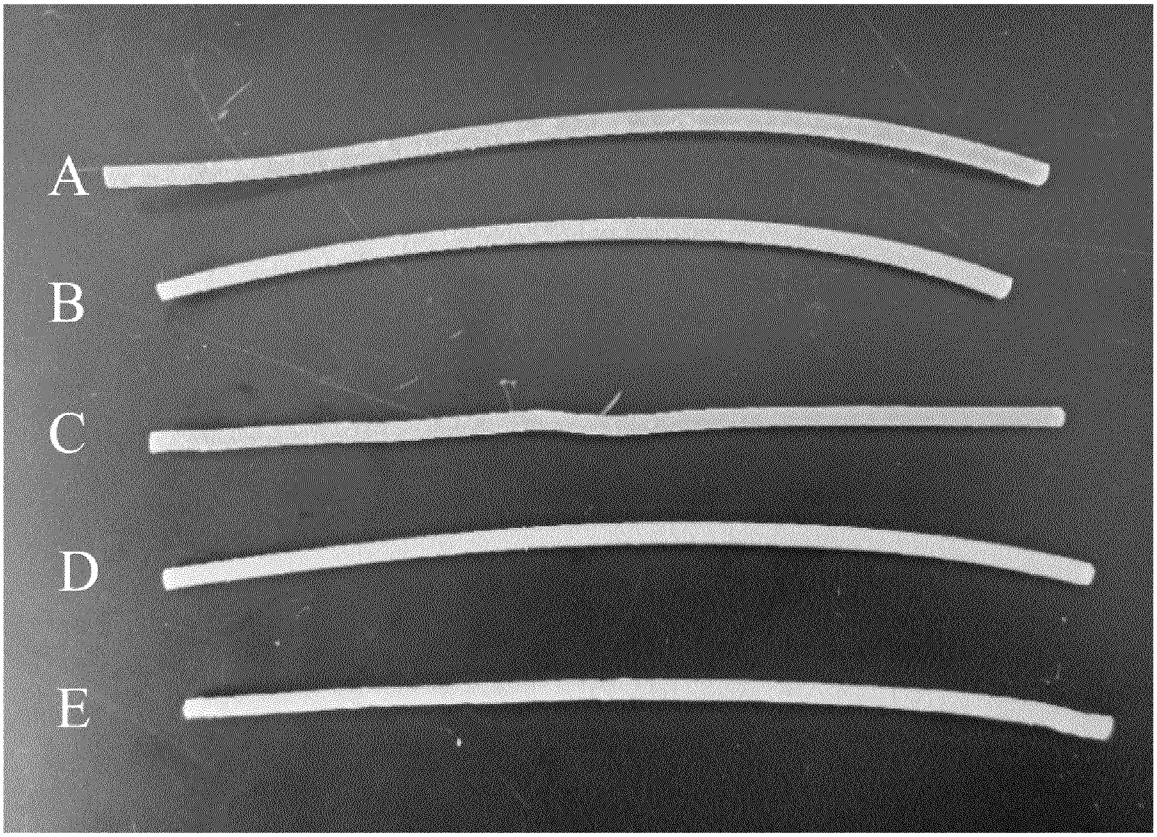
FIG. 5 shows the extruded BPF:PP composites where the target wt % loading of BPF in PP has been varied: (A) 5 wt % (B) 10 wt % (C) 15 wt % (D) 20 wt % and (E) 25 wt %.

Incremental incorporation of 5, 10, 15, 20 and 25 wt % BPF in PP were targeted (Examples 2-6, FIGS. 4 and 5), and the pellet and powder flows in the extruder were adjusted and synchronized to deliver these targets. TGA of the extruded strand at three different regions was chosen to assess the actual incorporation of BPF in PP as well as uniformity over the course of the extrusion. TGA of 100% BPF (chitosan and sodium alginate in a weight ratio of 75:25 combined in a weight ratio of 50:50 with PEG) showed a mass loss of 23.9% at 300° C., and this mass loss was used to calculate the percent incorporation of the BPF in PP at 300° C. This temperature was chosen based on the decomposition of BPF in the presence of PP.

Table 2 summarizes the data collected for each of the wt % BPF tested. TGA data for the various ratios of BPF incorporated into PP show that in general the actual incorporation of BPF was lower than the targeted concentration of BPF, with variability of about 2 wt % BPF throughout the strand. The lower than expected incorporation of BPF is expected to be due to the difficulty in synchronizing the delivery rates of BPF and PP from their respective feeders relative to each other, and also because of the low extrusion rates employed at bench scale. It is expected that with higher extrusion rates, increased flexibility with the BPF and PP feeders would be possible, facilitating higher incorporation.

TABLE 2

Summary of TGA data collected for different BPF composition.

| BPF loading wt % | Example | Replicate | % weight loss at 300° C. | Approx. weight % in PP |
|---|---|---|---|---|
| 100 | — | — | 23.9 | — |
| 5 | Comp. 3 | 1 | 1.6 | 6.8 |
| | | 2 | 0.7 | 3.1 |
| | | 3 | 0.9 | 3.9 |
| 10 | Comp. 4 | 1 | 1.7 | 7.3 |
| | | 2 | 5.8 | 24.2 |
| | | 3 | 1.8 | 7.4 |
| 5 | 2 | 1 | 2.8 | 7.3 |
| | | 2 | 3.0 | 7.8 |
| | | 3 | 2.6 | 6.9 |
| 10 | 3 | 1 | 3.8 | 10.1 |
| | | 2 | 3.6 | 9.5 |
| | | 3 | 3.7 | 9.7 |

Another issue arose from the melting of p2 component of the BPF after entering the feeding funnel, subsequently resulting in the BPF tending to collect on the sides of the feeding funnel and additional unintended BPF entry into the extruder at random. This is shown in the results for 10 wt % BPF (Example 3, FIG. 4, replicate #2) where elevated presence of BPF was observed in the location sampled on the strand.

While TGA gives direct measurement of the BPF thermal stability, it cannot replicate the pressure the BPF:PP blend is subject to during extrusion. Pressure during extrusion (3-10 bar) can have a significant influence on the thermal stability of the composite material under industrial conditions. The discolouration of the extruded material was used to indicate the onset of degradation for the BPF. Many temperature profiles were tested. The extruder screw speed was held constant so that the residence time of material upon entering the feed at zone 2 would be approximately 1.5 minutes. The BPF was held constant at 10 wt % in PP for the duration of the trials (e.g. variant based on the composition of Example 3). The barrel temperature was then increased in marginal increments and allowed to stabilize before extruded material was collected and evaluated (Table 3).

TABLE 3

Summary of some useful temperature profiles where zone and die temperatures have been varied with melt temperature and pressure data measured at the extruder die.

| Temperature Profile | Temp. profile A | Temp. profile B |
|---|---|---|
| Zone 2 | 160° C. | 160° C. |
| Zone 3 | 199° C. | 200° C. |
| Zone 4 | 220° C. | 225° C. |
| Zone 5 | 220° C. | 225° C. |
| Zone 6 | 215° C. | 220° C. |
| Zone 7 | 215° C. | 220° C. |
| Zone 8 | 215° C. | 220° C. |
| Die | 205° C. | 210° C. |
| Melt | 190° C. | 197° C. |
| Pressure | 3 bar | 4 bar |

BPF concentration was held constant at 10 wt % in PP.

Figure 6:
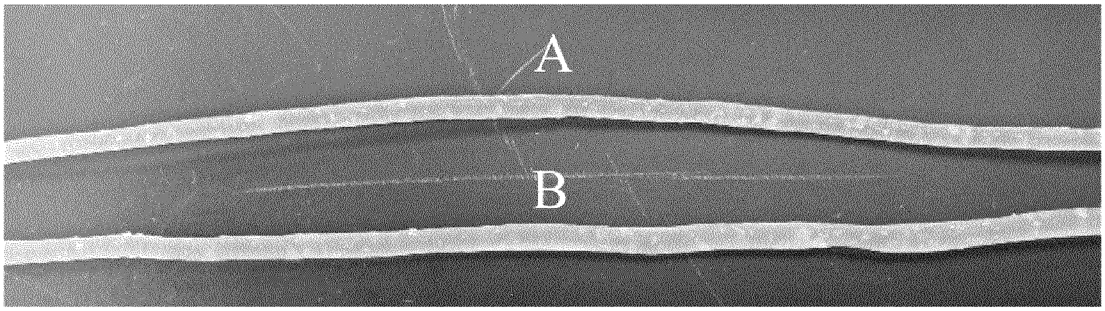
FIG. 6 shows the extruded 5 wt % BPF:PP blends at temperature profiles A and B.

Generally, relating the temperature profile to the processing of PP films, a melt temperature near 200° C. would be considered a minimum to cast a film. Based on TGA data collected on extruded 5 wt % BPF:PP blend, the onset of decomposition is to be expected around 225° C., which is achieved in temperature profile B. No obvious visual discolouration was observed in the extruded BPF:PP blend for temperature profiles A and B (FIG. 6).

Figure 7:
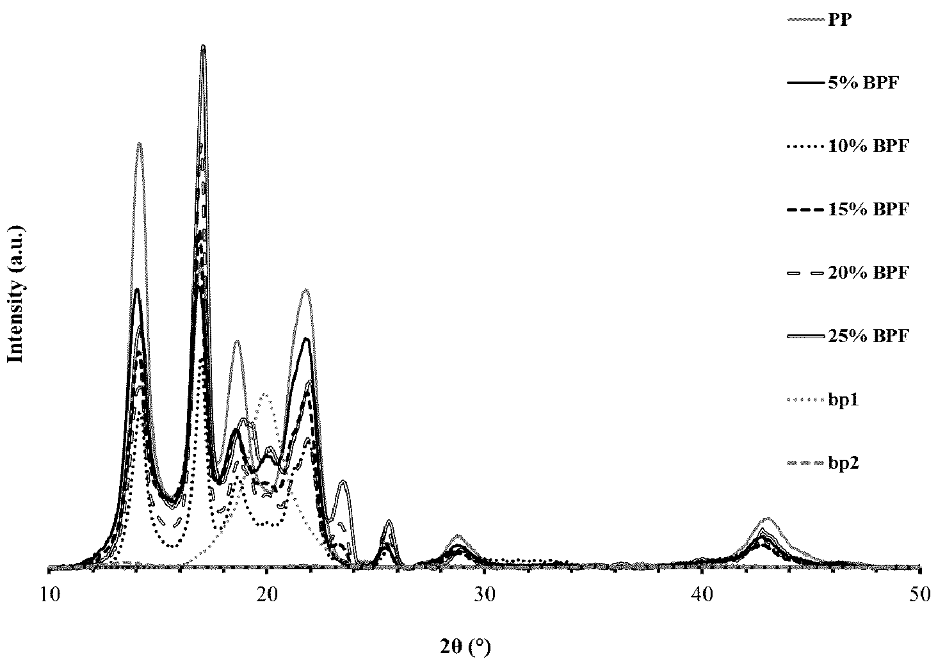
FIG. 7 shows the overlaid powder X-ray diffraction (XRD) data for variably weight-loaded BPF in PP.

Powder X-ray diffraction (XRD) of the variably weight-loaded BPF in PP was conducted to reveal any changes in crystallinity in PP or bp1 as a result of their compatibilization (FIG. 7, Examples 2-6 and pure PP, chitosan and sodium alginate). All weight loadings showed similar patterns to individual PP and bp1 phases, and no significant shift in peak position was observed which indicated the absence of significant interactions between the crystalline regions of PP and BPF. As the concentration of BPF increased, the respective peaks for BPF increased in intensity as expected.

Micronization of the Biopolymers

With the initial survey of extrusion behaviour complete, efforts were focused towards tuning the particle size of the BPF to better suit the target for thin CPP films of less than 30 μm and optimizing the extrusion profile of the micronized BPF (μBPF).

Figure 8A:
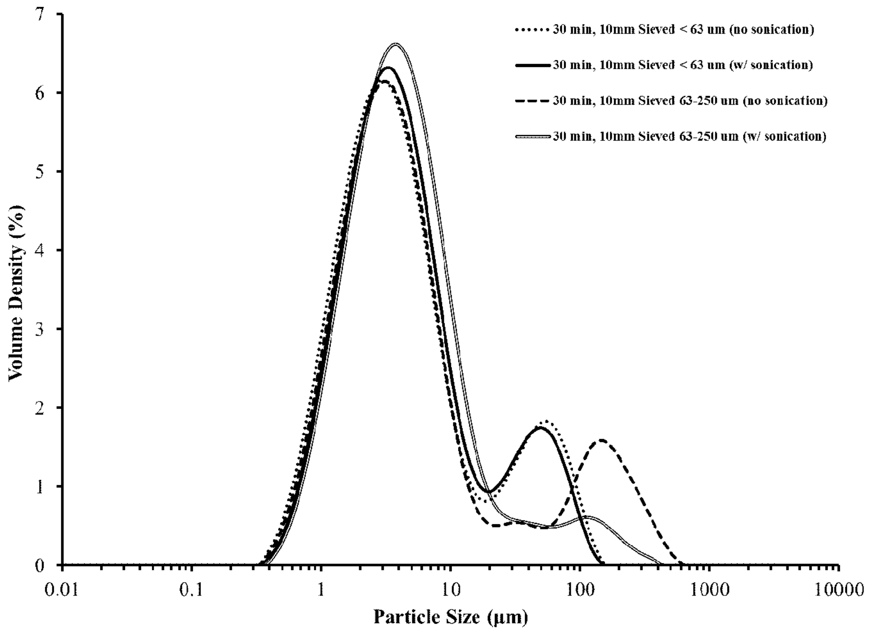
FIG. 8 shows (A) the volume density, (B) the volume average particle size, and (C) the $D_x$ 90 of milled chitosan flakes sieved at 63 μm and 63-250 μm fractions with sonication (lighter columns) and without sonication (darker columns).
Figure 8B:
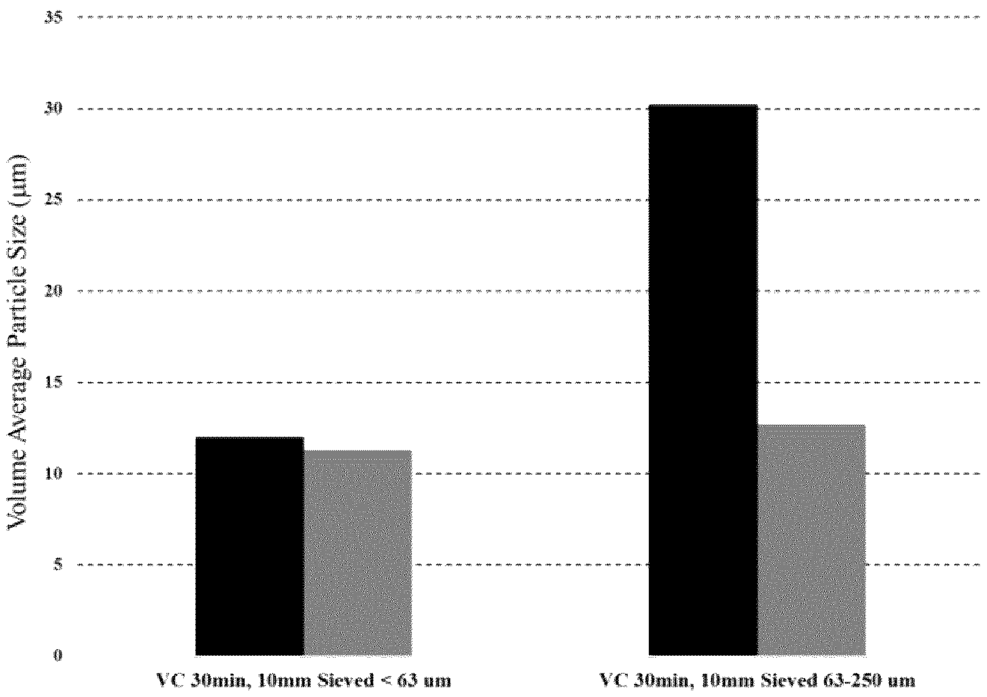
Figure 8C:
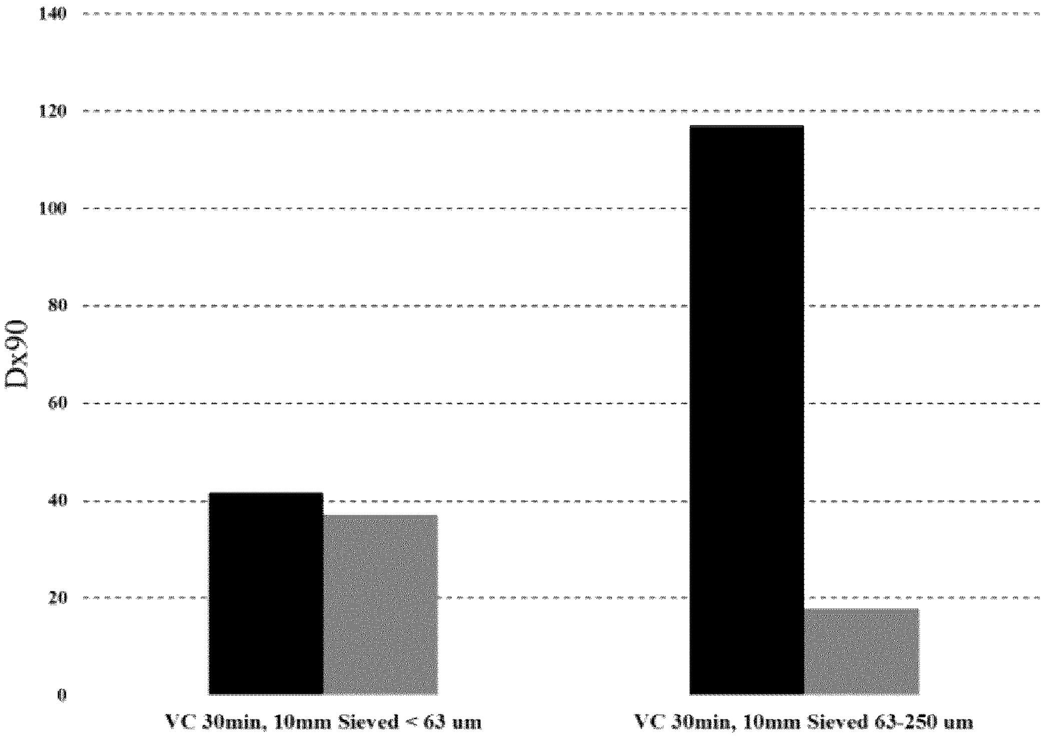

45 g of chitosan (bp1) flakes (approximately 5-10 mm) were ground using a high energy planetary ball mill with 10 mm zirconia grinding media in a zirconia bowl for 30 minutes at 450 rpm. The ground material was sieved at 63 μm and 250 μm. Approximately 13% of the material was under 63 μm, 40% between 63-250 μm, and 50% above 250 μm. Data for the particle size analyses of the 63 μm fraction and 63-250 μm fractions are summarized in FIG. 8. The volume average particle size of 12.0 μm for the <63 μm fraction was well under the target of 30 μm, while the 63-250 μm fraction was just at the target measuring 30.2 μm.

Another measurement that is important to consider is $D_x$ 90, whose value indicates that 90% of the particles in the sample are under the reported value. In the case of the <63 μm fraction, the $D_x$ 90 was 47.1 μm, while the 63-250 μm fraction was 117 μm. Given the particle sizes at which the sample was sieved, these values are reasonable.

Interesting behaviour was observed when the samples were subjected to low level ultrasonication during particle size analysis. Applying ultrasonication aids in separating aggregated particles during the analysis and gives a better representation of what the primary particle size of the sample is. The values of volume average particle size and $D_x$ 90 for the <63 μm fraction dropped slightly to 11.3 μm and 37.1 μm respectively. In contrast, the values of volume average particle size and $D_x$ 90 for the 63-250 μm fraction dropped significantly to 12.7 μma and 17.9 μm respectively. This indicates that the 63-250 μm fraction is primarily composed of charge-aggregated particles, which can occur as a result of milling, and further milling would likely not reduce the particle size. There is potential that given the high pressure and shear mixing conditions during the extrusion process that the 63-250 μm fraction could provide the necessary conditions to separate these charge aggregated particles.

Further refinement of bp1 particle size could be achieved by using progressively finer sieves. The use of finer particles helped reduce the likelihood of any film defects caused by the presence of larger particles in the final blend, and allowed thinner films to be produced if desired. It was found that using a 45 μm sieve allowed 2.5% of the initial material isolated after the milling procedure. This fraction of bp1 possessed a volume average particle size of 9.91 μm and a $D_x$ 90 of 31.8 μm.

Unfortunately, due to the nature of sodium alginate (bp2) it could not be analyzed by the wet particle size analysis method used for bp1. Therefore, two 50 g samples of the bp2 material were sieved separately at 63 μm. 41% and 39% of the bp2 was recovered from each of the portions respectively. The remaining material >63 μm was combined and ground with 10 mm zirconia grinding media for 15 min at 450 rpm in the planetary ball mill, yielding 31% of the material after being sieved at 63 µm.

Figure 9A:
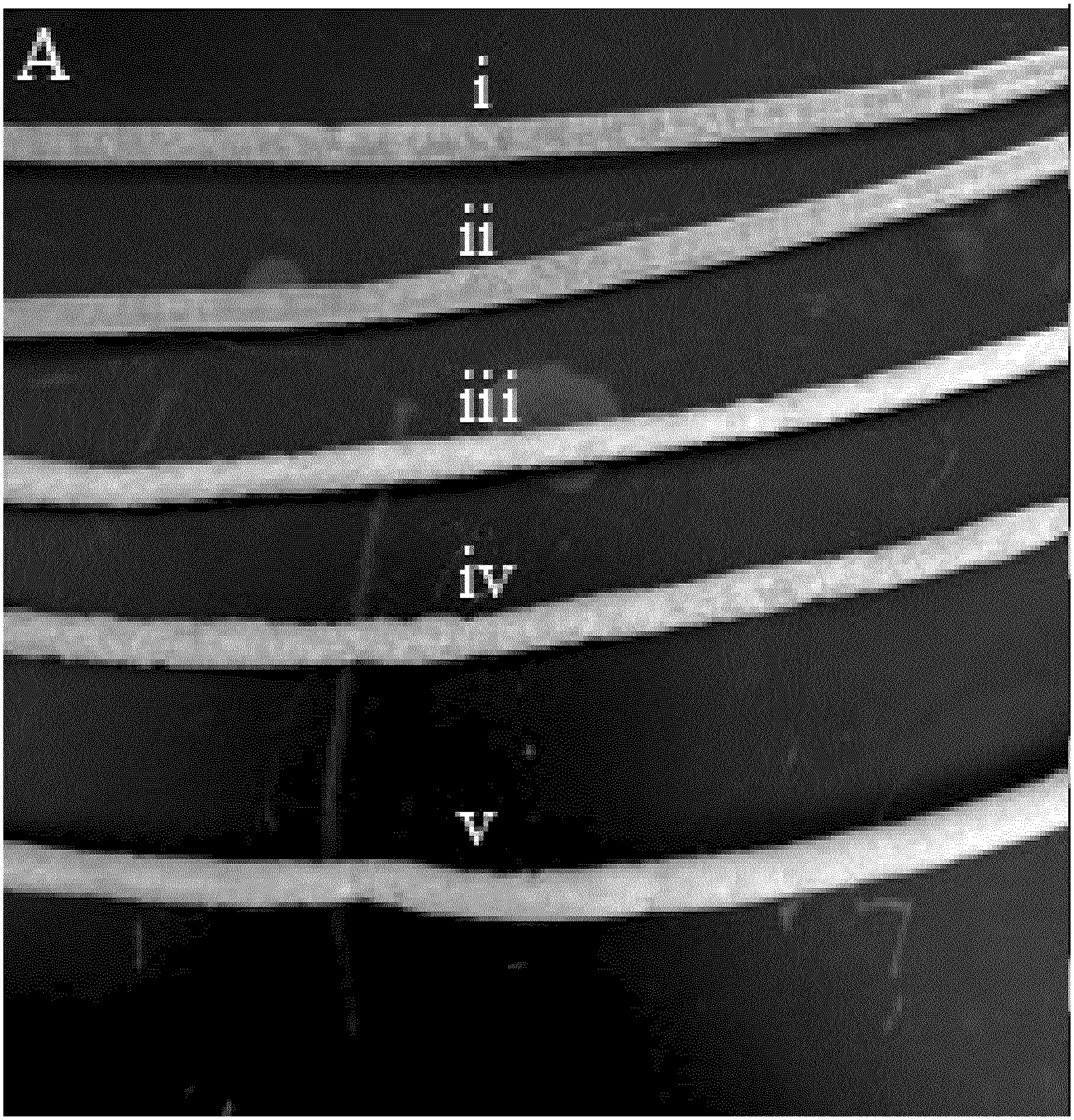
FIG. 9 shows the extruded BPF:PP blends of (A) <63 μm and (B) 63-250 μm containing (i) 5 wt % (ii) 10 wt % (iii) 15 wt % (iv) 20 wt % and (v) 25 wt % of BPF.
Figure 9B:
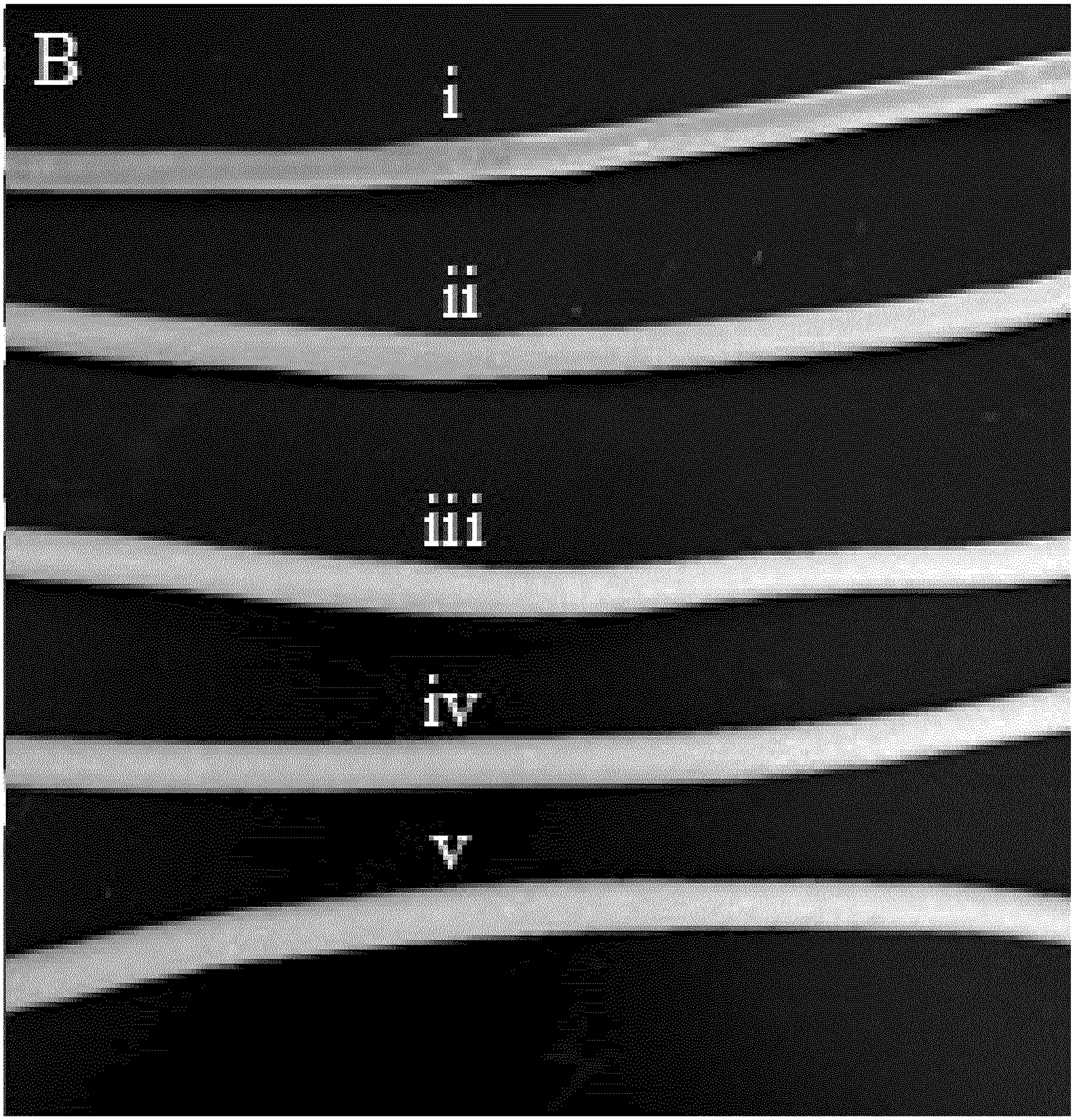
Figure 10A:
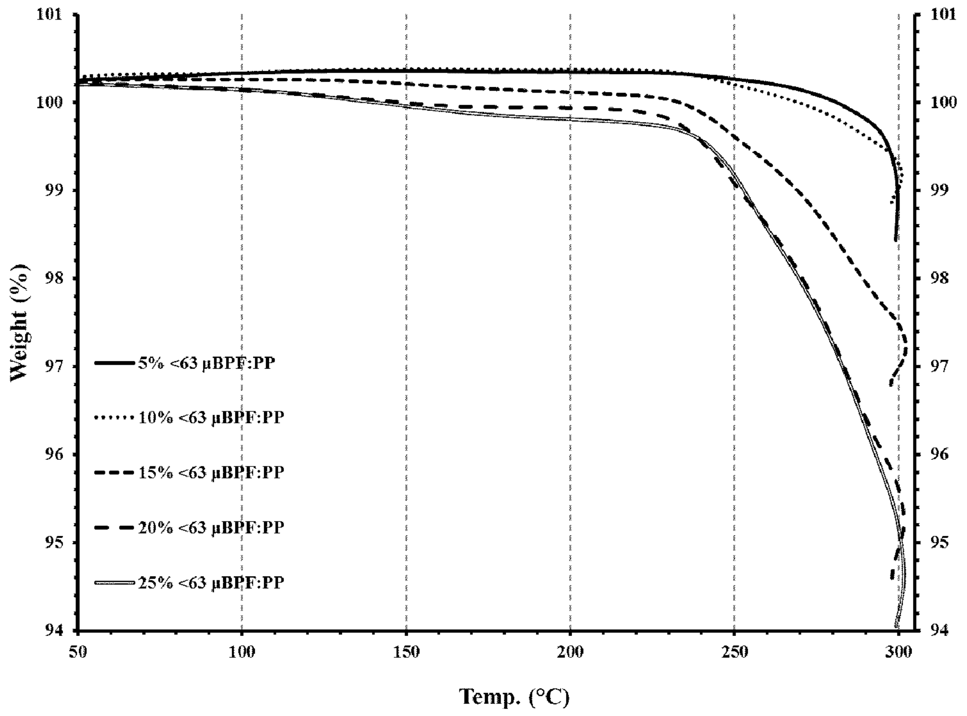
FIG. 10 shows the TGA data for extruded (A) <63 μm and (B) 63-250 μm pBPF:PP blends.
Figure 10B:
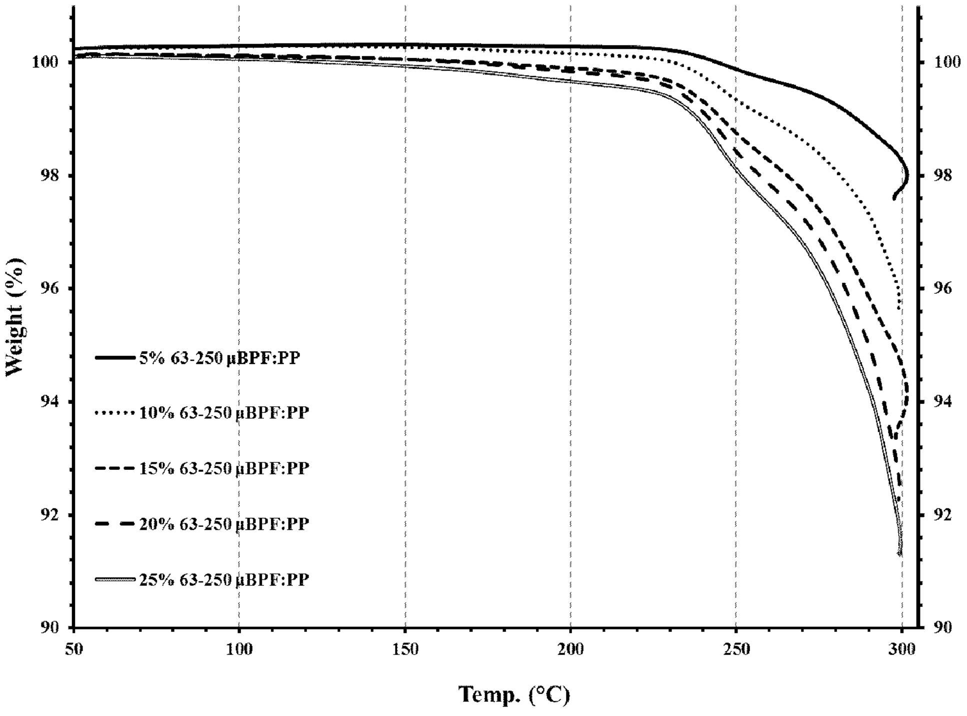

Using a temperature profile comparable to previous thermal stability trials (Table 4), and the wt % loading of µBPF in PP was increased between 5 wt % and 25 wt % in 5 wt % increments. Two 1.1 BPFs were utilized—one containing <63 µm and the other with 63-250 µm biopolymers. As with the previous temperature trials, the extruder screw was held constant to achieve a residence time of 1.5 minutes. The PP/c2 feeding rate was also held constant. Some discolouration was observed in the extruded material (FIGS. 9 and Examples 8-11—representing the extremities of that range) in both <63 µm and 63-250 µm µBPFs, which could be a result of a molecular weight reduction of larger biopolymer chains to smaller biopolymer chains leading to reduced thermal stability. Distribution of both µBPFs appeared to be significantly improved over coarser BPF given the opacity of the µBPF:PP blends, and the lack of visually observed biopolymer clusters. The thermal stability of these blends as measured by TGA is shown in FIG. 10.

TABLE 4

| Temperature profile<br>Temperature Profile | |
|---|---|
| Zone 2 | 155° C. |
| Zone 3 | 193° C. |
| Zone 4 | 210° C. |
| Zone 5 | 210° C. |
| Zone 6 | 195° C. |
| Zone 7 | 195° C. |
| Zone 8 | 195° C. |
| Die | 184° C. |
| Melt | 173° C. |
| Pressure | 5 bar |

Mechanical Properties

Mechanical tests were conducted using Shimadzu EZ-LX-HS universal tensile machine in accordance with ASTM standard D882-18 on samples having 8-10 mm width with grip separation of 30 mm. The load rate was 12.5 mm/min.

The results of these measurements are reported in Table 5. Typically, an introduction of solid particulate in a polymer matrix significantly reduces elasticity. Surprisingly, the BPF formulations showed elasticity comparable or exceeding that of polymer matrix. The ultimate tensile strength of BPF formulation blends was also generally higher than that of neat polymer matrix. Blends containing bp2 showed somewhat lower mechanical properties than blends of BPF where only bp1 was used.

TABLE 5

Summary of mechanical testing data for BPF composite film obtained using parameters described in Examples.

| Example | Thickness (µm) | Elongation at break (%) | Yield tensile strength (MPa) | Ultimate tensile strength (MPa) | Elastic modulus (MPa) |
|---|---|---|---|---|---|
| Reference* | 259.2 ± 19.4 | 743.8 ± 135.8 | 14.59 ± 0.45 | 18.83 ± 3.53 | 332.0 ± 30.1 |
| Comp. 3 | 239.2 ± 20.9 | 1027.9 ± 65.5 | 13.25 ± 0.54 | 20.42 ± 2.70 | 335.5 ± 21.8 |
| 2 | 206.5 ± 14.4 | 768.2 ± 121.3 | 11.24 ± 0.44 | 15.56 ± 1.69 | 321.2 ± 24.6 |
| Comp. 4 | 236.0 ± 24.2 | 1029.5 ± 130.1 | 11.51 ± 0.10 | 20.05 ± 1.04 | 320.0 ± 43.6 |
| 3 | 268.2 ± 20.2 | 965.8 ± 72.9 | 13.26 ± 0.38 | 16.45 ± 0.62 | 316.3 ± 31.2 |
| Reference* | 118.6 ± 12.2 | 568.0 ± 142.5 | 10.46 ± 0.20 | 16.18 ± 2.57 | 349.4 ± 63.2 |
| Comp. 3 | 120.4 ± 14.3 | 698.3 ± 41.2 | 10.72 ± 0.69 | 17.98 ± 1.53 | 278.5 ± 24.4 |
| 2 | 119.5 ± 4.1 | 673.1 ± 81.6 | 9.51 ± 0.49 | 14.75 ± 1.92 | 265.1 ± 19.3 |
| Comp. 4 | 118.6 ± 12.2 | 567.9 ± 142.9 | 10.46 ± 0.19 | 16.18 ± 2.57 | 299.4 ± 63.3 |
| 3 | 128.5 ± 8.6 | 628.19 ± 76.1 | 7.78 ± 0.41 | 11.91 ± 1.91 | 271.1 ± 26.2 |
| Reference* | 60.6 ± 2.9 | 443.2 ± 129.0 | 10.44 ± 0.56 | 13.53 ± 1.90 | 288.2 ± 21.2 |
| Comp. 3 | 68.8 ± 4.4 | 563.6 ± 160.2 | 11.63 ± 0.60 | 16.35 ± 3.22 | 269.4 ± 44.3 |
| Comp. 4 | 60.7 ± 2.9 | 482.1 ± 66.3 | 10.31 ± 0.62 | 14.08 ± 1.78 | 277.3 ± 21.9 |

*Reference is PP/mPP blend mixed in a ratio 1:17.

CONCLUSIONS

A composite biopolymer formulation (BPF), consisting of sustainably-sourced biopolymers, was developed to incorporate biodegradable components into CPP films and replace a significant percentage of plastic (PP) from the final packaging formulation.

The scope of the claims should not be limited by the preferred embodiments set forth in the examples, but should be given the broadest interpretation consistent with the description as a whole.

REFERENCES

The present description refers to a number of documents, the content of which is herein incorporated by reference in their entirety. These documents include, but are not limited to, the following:

American patent application, publication no. 2011/135912 A1;

U.S. Pat. No. 5,635,550;

Chinese patent no. 102120514 B;

Caner, C., Vergano, P. J., & Wiles, J. L. (1998). Chitosan Film Mechanical and Permeation Properties as Affected by Acid, Plasticizer, and Storage, 63(6), 1049-1053;

Carrasco-Guigón, F., Rodríguez-Félix, D., Castillo-Ortega, M., Santacruz-Ortega, H., Burruel-Ibarra, S., Encinas-Encinas, J., . . . Madera-Santana, T. (2017). Preparation and characterization of extruded composites based on polypropylene and chitosan compatibilized with polypropylene-graft-maleic anhydride. Materials, 10(2), 105;

Matet, M., Heuzey, M.-C., Ajji, A., & Sarazin, P. (2015). Plasticized chitosan/polyolefin films produced by extrusion. Carbohydrate Polymers, 117, 177-184;

Meng, Q., Heuzey, M.-C., & Carreau, P. J. (2014). Hierarchical structure and physicochemical properties of plasticized chitosan. Biomacromolecules, 15(4), 1216-1224;

Van Den Broek, L. A. M., Knoop, R. J. I., Kappen, F. H. J., & Boeriu, C. G. (2015). Chitosan films and blends for packaging material. Carbohydrate Polymers, 116, 237-242; and Vieira, M. G. A., da Silva, M. A., dos Santos, L. O., & Beppu, M. M. (2011). Natural-based plasticizers and biopolymer films: A review. European Polymer Journal, 47(3), 254-263.

The invention claimed is:

1. A biopolymer composite consisting of:

a) an alginate salt, b) chitosan, c) a plasticizer, d) a compatibilizer selected from maleic anhydride, polypropylene-grafted-maleic anhydride (PP-g-MA), epoxy styrene-acrylic oligomers (ESAO), poly(ethylene-co-octene), polyvinyl alcohol (PVA), polyvinyl acetate, poly(ethylene-co-vinyl alcohol), glycidyl methacrylate (GMA), metallocene polypropylene (mPP), or a mixture thereof, e) a thermoplastic polymer, and f) optionally one or more additives selected from an anti-block, an anti-static agent, a pigment, a flame retardant, an antioxidant, an acid scavenger, an UV light stabilizer, and a cross-linking agent, wherein the alginate salt, the chitosan, the plasticizer and the compatibilizer are dispersed in a matrix of the thermoplastic polymer.

2. The composite of claim 1, wherein the alginate salt is sodium alginate, potassium alginate, or calcium alginate.

3. The composite of claim 1, wherein:

the chitosan and the alginate salt are present at a chitosan: alginate salt weight ratio of about 50:50 to about 99.5:0.5, the plasticizer is present at a concentration between about 1 wt % to about 60 wt %, the chitosan, the alginate salt, and the plasticizer are present at a total concentration of about 1 wt % to about 65 wt %, based on the total weight of the biopolymer composite, the compatibilizer is present at a concentration between about 1 wt % to about 5 wt %, based on the total weight of the biopolymer composite, the thermoplastic polymer is present at a concentration between about 30 wt % and about 98 wt %, based on the total weight of the biopolymer composite, and the compatibilizer and thermoplastic polymer are present at a total concentration between about 31 wt % and about 99 wt %, based on the total weight of the biopolymer composite.

4. The composite of claim 1, wherein the plasticizer is polyethylene glycol (PEG), polypropylene glycol (PPG), glycerol, or a mixture thereof.

5. The composite of claim 1, wherein the compatibilizer is maleic anhydride, PP-g-MA or mPP.

6. The composite of claim 1, wherein the thermoplastic polymer is a polyolefin, polylactic acid, polycaprolactone, poly-3-hydroxybutyrate, or a copolymer or mixture thereof.

7. The composite of claim 5, wherein the compatibilizer is a thermoplastic polymer.

8. A method for producing the biopolymer composite of claim 1, wherein components a) to e) and optionally component f) are brought together and compounded into the biopolymer composite.

9. The method of claim 8 comprising:

step i) providing components a) to e) and optionally component f), and step ii) compounding components a) to e) and optionally component f) into the biopolymer composite.

10. The method of claim 9, wherein the compounding in step ii) is co-extrusion, melt-casting, injection-molding, or blown film extrusion process.

11. The method of claim 9, wherein the compounding is carried out at a temperature between about 150° C. and about 250° C.

12. The method of claim 9, wherein, in step i), components a) to c) are provided in the form of a biopolymer masterbatch.

13. The method of claim 12, wherein the masterbatch further comprises components d) and/or f).

14. The method of claim 12 wherein the masterbatch does not comprise component f), and component f) is provided separately from the biopolymer masterbatch in step i).

15. The method of claim 12, wherein the masterbatch does not comprise components d), and component d) anis provided separately from the biopolymer masterbatch in step i).

16. The method of claim 15, wherein, in step i), components d) and e) are provided separately from one another.

17. The method of claim 15, wherein, in step i), components d) and e) are compounded together, before step i), so component d) is uniformly distributed within a matrix of component e).

* * * * *